Dec. 3, 1968          R. E. MORGAN          3,414,797
POWER CONVERTER EMPLOYING INTEGRATED MAGNETICS
Filed May 20, 1966                    9 Sheets-Sheet 1
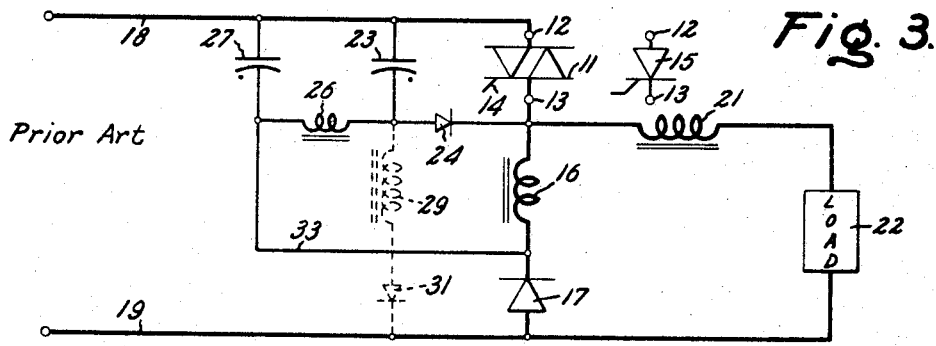
Fig. 3. Prior Art
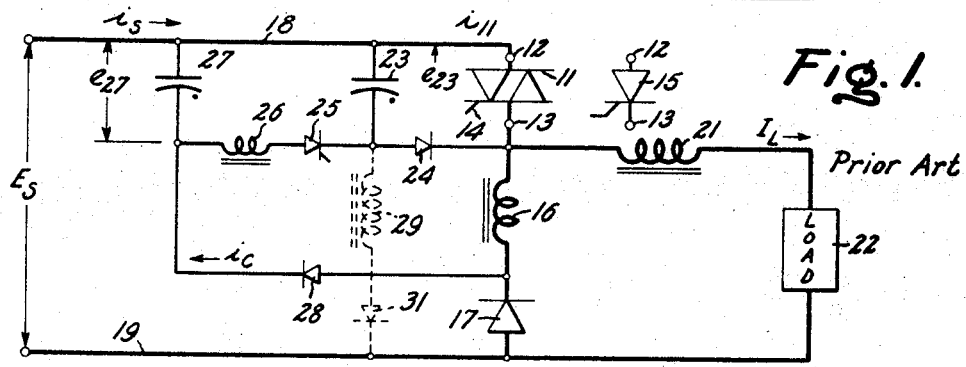
Fig. 1. Prior Art
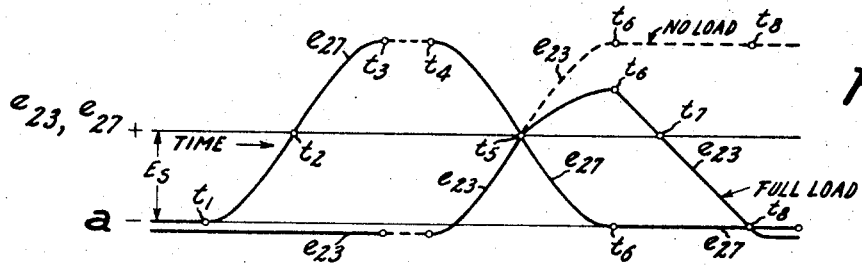
Fig. 2.
a
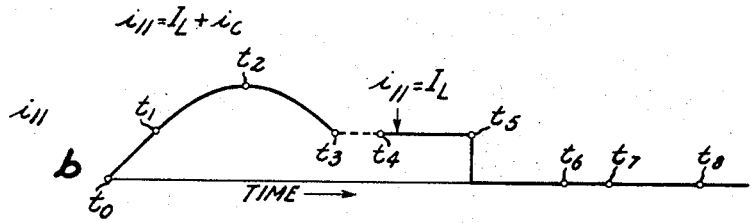
b
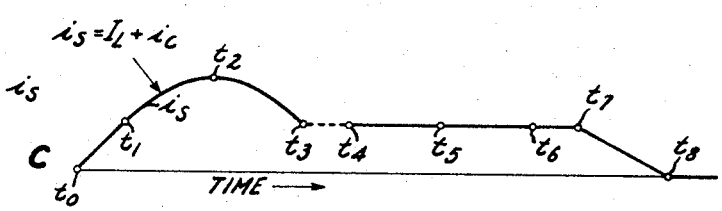
c
Inventor:
Raymond E. Morgan,
by Paul A. Frank
His Attorney.

Dec. 3, 1968   R. E. MORGAN   3,414,797
POWER CONVERTER EMPLOYING INTEGRATED MAGNETICS
Filed May 20, 1966   9 Sheets-Sheet 2

Inventor:
Raymond E. Morgan,
by Paul A. Frank
His Attorney.

*Inventor:*
*Raymond E. Morgan,*
*by Paul A. Frank*
*His Attorney.*

Inventor:
Raymond E. Morgan,
by Paul A. Frank
His Attorney.

Inventor:
Raymond E. Morgan,
by Paul A. Frank
His Attorney.

Dec. 3, 1968 R. E. MORGAN 3,414,797
POWER CONVERTER EMPLOYING INTEGRATED MAGNETICS
Filed May 20, 1966 9 Sheets-Sheet 6

Inventor:
Raymond E. Morgan,
by Paul A. Frank
His Attorney.

Inventor:
Raymond E. Morgan,
by Paul A. Frank
His Attorney.

Inventor:
Raymond E. Morgan,
by Paul A. Frank
His Attorney.

Inventor:
Raymond E. Morgan,
by Paul A. Frank
His Attorney.

United States Patent Office 3,414,797
Patented Dec. 3, 1968

3,414,797
POWER CONVERTER EMPLOYING
INTEGRATED MAGNETICS
Raymond Evan Morgan, Schenectady, N.Y., assignor to
General Electric Company, a corporation of New York
Filed May 20, 1966, Ser. No. 551,607
29 Claims. (Cl. 321—2)

ABSTRACT OF THE DISCLOSURE

A power converter circuit is described which includes at least one semiconductor controlled conducting device such as a silicon-controlled rectifier or triac bidirectional conducting device. A unitary, multi-function inductive device, such as an output transformer, is provided which has a plurality of elemental inductive portions which exhibit predesigned leakage inductive reactance. The unitary multi-function inductive device is connected in circuit relationship with the semiconductor controlled conducting device and a source of electric energy in a manner such that the predesigned leakage inductive reactance interacts with the actual inductive reactance of the elemental inductive portions of the unitary multi-function inductive device to cause selected ones of the elemental inductive portions to perform multiple different functions during operation of the power circuit. In preferred embodiments, the unitary multi-function inductive device comprises a single magnetically permeable core and a multiplicity of windings wherein the interaction of the predesigned leakage reactance causes selected ones of the windings to perform multiple different functions.

---

This invention relates to power converter circuits employing integrated magnetics.

More specifically, the invention relates to thyristor power converter circuits employing a unitary, multi-function inductive device having predesigned leakage inductive reactance that provides for integration of the magnetic functions required by the converter such as output transformation, cushioning, resonating, filtering, insulation from the output, etc. Further, the invention relates particularly to power thyristor circuits employing integrated magnetics as defined above and in addition providing for soft commutation of the power thyristor.

Power semiconductor devices are now being used quite widely throughout industry for a large number of control purposes. A number of these power semiconductor devices are characterized as thyristors in that they require some form of external turn-off after they have been placed in a conducting state. Some of the better known commercial forms of thyristors are the silicon-controlled rectifier, the triac, and the diac. The turn-off process which generally requires reversal of the polarity of the potential across the load terminals of the device, or expressed differently, a reversal of the direction of current flow through the device, is termed "commutation." The external circuitry which accomplishes turn-off of a thyristor is known as a commutation circuit.

There are a number of known commutation circuits for power semiconductors of the thyristor type which are satisfactory for use in a wide number of power control circuits. There are a certain number of power control circuits, however, particularly those designed for use at high frequencies for which the known commutation circuits are not satisfactory. This is due to the fact that many of the existing commercial thyristor devices are not capable of operating with high rates of re-applied voltage (high $dv/dt$), or large rates of change of current (high $di/dt$) without the use of special softening components that introduce losses due to heating, especially at higher frequencies of operation. To overcome these difficulties, special soft commutation circuits have been developed and have been described in a paper entitled, "Basic Magnetic Functions in Converters and Inverters Including New Soft Commutation," by Ray E. Morgan, IEEE Transactions on Industry and General Applications, volume IGA-2, No. 1 January/February 1966, pages 58 to 65. Soft commutation circuits also have been disclosed in U.S. application Ser. No. 504,744, filed Oct. 24, 1965, R. E. Morgan, inventor, entitled, "Soft Commutation Scheme for Power Semiconductor Circuits," and assigned to the same assignee as the present application.

Characteristically, most commutation circuits require some inductive reactance in their operation. As a matter of fact, a large proportion of the known commutation circuits require inductive reactance at two or more points in the circuit. This is particularly true of soft commutation circuits which require both cushioning and resonating inductance in addition to any filtering or output transformation that might be required. The need for inductive reactance at all these points makes a power converter circuit rather cumbersome and expensive if individual or discreet inductive elements are employed at all points in the circuit where the inductive reactance is required. To overcome this problem, the present invention was devised.

It is therefore a primary object of the present invention to provide new and improved thyristor power converter circuits which employ a unitary multi-function inductive device having predesigned leakage inductive reactance that provides for integration of the magnetic functions required by the converter circuit such as output transformation, cushion, resonating, filtering, insulation from the output, etc.

A further object of the invention is the provision of new and improved thyristor power converter circuits having the above set forth characteristics and which also employ soft commutation principles in their mode of operation.

Still another object of the present invention is the provision of new and improved power converter circuits having the above set forth characteristics which are smaller, lighter, simpler to construct, less expensive, and capable of operation at higher frequencies than previously known converters of the same general type.

A still further object of the present invention is the provision of new and improved power converter circuits incorporating all of the above advantages and which are self-protecting against open circuit and short circuit operating conditions.

Other objects, features, and many of the attendant advantages of this invention will become better appreciated as the invention becomes more fully understood when considered in connection with the accompanying drawings, wherein like parts in each of the several figures are identified by the same reference numeral, and wherein:

FIGURE 1 is a schematic circuit diagram of a known time-ratio controlled power circuit employing soft commutation which provides protection against both high $dv/dt$ and high $di/dt$ during commutation intervals;

FIGURE 2 is a series of voltage versus time operating characteristic curves illustrating the operation of the circuit shown in FIGURE 1;

FIGURE 3 is a schematic circuit diagram of a modified form of the circuits shown in FIGURE 1, and which requires one less thyristor device;

Figure 4:
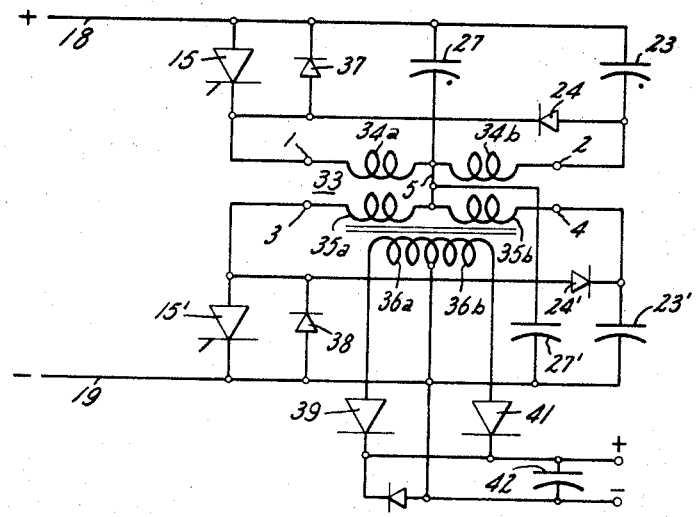
FIGURE 4 is a schematic circuit diagram of a new and improved power converter circuit which utilizes integrated magnetics as defined above, and which also provides for soft commutation.

FIGURE 1 of the drawing is a schematic circuit diagram of a known time-ratio controlled power circuit which provides for soft commutation of a power semiconductor device employed to control electric power supply to a load. In the known circuit arrangement of FIGURE 1, a power semiconductor device shown at 11 comprises a gate-controlled triac bidirectional semiconduuctor device of the type recently made commercially available by the Semiconductor Products Department of the General Electric Company. The triac was first described in a paper appearing in the Journal of Applied Physics, vol. 30, No. 11, November 1959, pages 1819 through 1824 by R. W. Aldrich and N. Holonyak, Jr., entitled, "Two Terminal Asymmetrical and Symmetrical Silicon Negative Resistance Switches." The triac device in its most recently commercially available form has been described in a textbook entitled Semiconductor Controlled Rectifiers; principles and Applications of p-n-p-n Devices by Gentry, Gutzweiller, Holonyak and Von Zastrow, published by Prentice-Hall, Inc., Englewood Cliffs, N.J., and in a paper entitled "Silicon Gate-Controlled A-C Switch and Its Applications," by H. F. Storm and D. L. Watrous, presented at the 1964 IEE International Non-Linear Magnetics Conference, Apr. 6, 1964, in Washington, D.C. For a more complete description of the characteristics of this device, reference is made to the above-identified papers.

Briefly, the triac device 11 is capable of conducting electric current in either direction depending upon the polarity of the potential across its load terminals 12 and 13 at the time that a gating-on-potential is applied to its control gate 14 by suitable gating-on circuit (not shown). A number of gating-on circuits suitable for use with the triac 11 are disclosed in the Silicon Controlled Rectifier Manual, Third Edition, published by the Semiconductor Products Department, of the General Electric Company located at Electronics Park, Syracuse, N.Y. See, for example, chapter 4 of this manual. Briefly stated, however, if the potential of load terminal 12 of triac 11 is positive with respect to the load terminal 13, and a gating-on potential is applied to the control gate 14, load current will be supplied through the triac 11 in the direction from 12 to 13. Alternatively, if the load terminal 13 is positive with respect to load terminal 12, then the load current flow will be from load terminal 13 to load terminal 12 upon a gating-on potential being supplied to the control gate 14. It should also be noted that in the circuit arrangement of FIGURE 1, the bidirectional conducting characteristics of triac 11 are not required, and a conventional gate-controlled silicon-controlled rectifier illustrated schematically at 15 can be inserted physically in place of the triac 11, by connecting its load terminals 12 and 13 in place of the correspondingly numbered load terminals of triac 11.

The load current carrying triac 11 is connected in series-circuit relationship with a cushioning inductive reactor 16 and a coasting rectifier 17 across a pair of power supply terminals 18 and 19 which in turn are adapted to be connected across a source of electric potential. For convenience, the source of electric potential will be assumed to be a direct current power supply wherein the power supply terminal 18 is positive with respect to the power supply terminal 19. A filter inductor 21 and a load 22 are connected in series-circuit relationship across the series-connected cushion conductor and coasting rectifier 17. These elements comprise the main load-current-carrying elements of the time-ratio-controlled power circuit.

In order to commutate off the load-current-carrying power triac 11 at appropriate intervals, commutation circuit means are provided which include commutation capacitance means comprised by first commutating capacitor 23 and a blocking diode 24 connected in series-circuit-relationship across the load terminals of the triac device 11. The series-circuit comprised by the commutating capacitor 23 and blocking diode 24 are connected in such a manner that the commutating capacitor is operatively coupled across the load terminals of the power triac device 11 and serves to limit the rate of rise of reapplied voltage across the device upon the device reverting to its blocking non-conducting condition. In order to cause the power triac device 11 to be turned off and returned to its blocking non-conducting condition, the juncture of the commutating capacitor 23 and blocking diode 24 is connected through an auxiliary commutating silicon-controlled rectifier device 25 and a resonating inductor 26 to a second commutating capacitor 27 that comprises a part of the commutating capacitance means of the commutation circuit. The juncture of the second commutating capacitor 27 and the resonating inductor 26 is connected through a feedback path including a feedback coupling diode 28 across the cushioning inductor 16. By this arrangement, the cushioning inductor 16 will serve to limit the rate of rise of load current ($di/dt$) through the power triac device 11 upon the device being turned on, thereby preventing damage to the device due to high $di/dt$. If desired, where no-load operating conditions are to be encountered, an auxiliary charging circuit comprised by charging inductor 29 and a charging diode 31 connected in series-circuit relationship between the juncture of the first commutating capacitor 23 and blocking diode 24 and the power supply terminal 19, may be provided. This circuitry will insure that the first commutating capacitor 23 is adequately charged prior to the commutating interval in order that the commutation circuit will completely commutate off the power triac device 11 during commutating intervals even under no-load operating conditions.

In operation, the soft commutation circuit of FIGURE 1 provides surge protection for the power semiconductor by the appropriate location and use of the cushioning elements of the commutating circuit. For convenience in the explanation of the operation of the circuit, it is assumed that the triac 11 is in its high impedance blocking or non-conducting condition following a preceding conducting interval, and that load current is being circulated through the load 22 by the filter inductor 21 and coasting rectifier 17 in conventional fashion. During this interval, the first commutating capacitor 23 is charged to substantially the full potential of the direct current power supply $E_s$ through diode 24, inductor 21 and load 22, with the polarity of the potential across the commutating capacitor 23 being negative at the dot. The second commutating capacitor 27 is similarly charged negative at the dot at the end of each commutation interval as will be explained more fully hereinafter. In the event that the circuit is operating at a substantially no-load condition, then charging of the first commutating capacitor can be accomplished through the charging inductor 29 and charging diode 31 inserted in the circuit for the purpose of allowing the circuit to operate under substantially no-load conditions. With the circuit in this condition, the triac 11 is then gated on by the application of a suitable turn-on signal to its control gate 14.

Immediately after turn-on of the triac 11 buildup of load current through the triac 11 is limited by the cushion inductor 16 which prevents a large change in the rate of current buildup through triac 11 (large $di/dt$) thereby protecting the device against substantial damage. The cushioning inductor 16 also serves to limit the amplitude of the reverse current flowing through the coasting rectifier 17 during this interval. Upon the load current through triac 11 reaching a value substantially equal to the load current flowing in load 22, the coasting rectifier 17 will stop conducting and block voltage. Also, it should be noted that upon turn-on of triac 11, the blocking diode 24 blocks and traps the charge on commutating capacitor 23. Subsequent to the coasting rectifier 17 turning off and assuming its blocking condition, the energy stored in the cushion inductor 16 will be transferred through the feedback means comprised in part by feedback diode 28 to the second commutating capacitor 27 to reverse the polarity of the charge across this capacitor. Thus, it can be appreciated that the energy developed in cushioning inductor 16 as a consequence of the cushioning effect it has during turn-on of triac 11, is not wasted, but is transferred back into the commutation circuit to be used for commutation off of the triac in a manner to be described more fully hereinafter. As a consequence of this action, this energy is not dissipated through the load with the resultant production of undesired current or voltage surges or overheating.

At this point in a cycle of operation, the circuit is in condition to be commutated off as determined by the control requirements which in turn are determined by the value of the load current to be supplied to load 22. Accordingly, when it is desired that the triac 11 be commutated off, the auxiliary commutating SCR 25 is turned on. The two commutating capacitors 23 and 27 and the resonating inductor 26 are tuned to series resonance at the desired commutating frequency, so that upon turn-on of the auxiliary commutating SCR 25, the charge on the two capacitors 27 and 23 oscillates through 180° and results in reversing the polarity of the potential across commutating capacitor 23 so that it now becomes positive at the dot. Upon this occurrence, the blocking diode 24 conducts, thereby diverting load current from the triac 11 and reversing the polarity of the potential across its load terminals 12 and 13 resulting in turning if off. After commutation off of the triac 11, the forward voltage rises across triac 11 at a relatively low rate of rise of reapplied forward voltage (low $dv/dt$) due to capacitor 23 which serves to limit the $dv/dt$ applied across the triac 11. Commutating capacitor 23 is then recharged in the previously described manner to initiate a new cycle of operation.

The voltage and current wave forms at various points in the circuit of FIGURE 1 are shown in FIGURE 2 of the drawings and facilitate an understanding of the operation of the circuit. Referring now to FIGURE 2 of the drawings, it is assumed that subsequent to time $t_8$ and prior to time $t_0$ at which point device 11 is turned on, the load current $I_L$ is being circulated through the load 22 and coasting rectifier 17 by the filter inductor 21. At time $t_0$, the triac device 11 is turned on and from time $t_0$ to time $t_1$, the current $i_{11}$ through the triac device as well as the current drawn from the supply voltage source $i_s$ increases from zero value to a value equal to the load current $I_L$ as shown in FIGURES 2b and 2c. Upon reaching this value at time $t_1$, coasting rectifier 17 blocks and the energy stored in the cushion inductor 16 is circulated through the feedback path including triac 11 and feedback diode 28 to second commutating capacitor 27 to reverse the polarity of the charge on the second commutating capacitor 27 as shown in FIGURE 2a of the drawings.

From an examination of FIGURE 2a, it can be seen that at time $t_1$, the potentials across the two commutating capacitors $e_{23}$ and $e_{27}$ are negative at the dot end of these capacitors. At time $t_1$, the potential $e_{27}$ of the second commutating capacitor 27 is oscillated through 180° during the time period from $t_1$ through $t_3$ to reverse the polarity of the charge across this capacitor so that it becomes positive at the dot end at time $t_3$. At time $t_2$, the charge from the capacitor 27 is zero. It should be noted at this point that the cushion inductor 16 is designed so that the series circuit comprised by cushion inductor 16 and second commutating capacitor 27 is series resonant at the desired commutating frequency, and hence the cushion inductor 16 has a value of inductance of about twice that of the resonating inductor 26. From an examination of FIGURES 2b and 2c of the drawings, it can be seen that during the interval of time that the polarity of the potential across the commutating capacitor 27 is being reversed, the supply current $i_s$ drawn from the supply is equal to the total value of $i_{11}$ flowing through the triac 11 and the current $i_c$ flowing in the feedback path comprising the feedback diodes 28. It should also be noted that this current as well as the current through triac 11 has a nice smooth sinusoidal wave shape having low $di/dt$.

As shown in FIGURE 2a of the drawings, at time $t_3$ the potential across the second commutating capacitor 27 has been reversed so that it is now positive at the dot end. At time $t_4$, the auxiliary commutating SCR 25 is turned on. The interval of time between $t_3$ and $t_4$ can be any value as determined by the control requirements and the requirements of load 22. Upon the auxiliary commutating SCR 25 being turned on at time $t_4$, the potential across the first commutating capacitor 23 is oscillated through 180° until it becomes positive at the dot side of capacitor 23 as explained previously. At time $t_5$, the value of this potential passes through zero. For no-load conditions, the value of the potential $e_{23}$ across the commutating capacitor 23 is shown in dotted line form, and as illustrated, remains at substantially the full value of the supply potential. However, when load current is being drawn by the load 22, the requirements of the load prevent the value of the potential $e_{23}$ across commutating capacitor 23 from reaching the full value of the supply potential, and it attains some intermediate value as shown by the solid line curve at time $t_6$. It should be noted, however, that this value is positive at the dot side of the capacitor so that blocking diode 24 is allowed to conduct and apply a reverse polarity potential across the load terminals of the triac 11 thus causing it to turn off. Concurrently with the reversal of potential $e_{23}$ across first commutating capacitor 23, the potential $e_{27}$ across the second commutating capacitor 27 is similarly oscillated through 180° so that it now again becomes negative at the dot side of the capacitor, and is conditioned for a new cycle of operation. From a comparison of FIGURES 2b, 2c, and 2a, it can be seen that during the interval of time $t_4$ to $t_5$, the triac 11 continues to conduct load current. However, at time $t_5$, as the potential $e_{23}$ across the first commutating capacitor 23 commences to reverse polarity, current through the triac 11 drops to zero value, and commutation is achieved. Subsequently, the value of supply current $i_s$ continues to equal the load current $I_L$ for the interval of time $t_5$ to $t_7$ during which interval of time load current is being supplied from the first commutating capacitor 23 to load 22. At time $t_7$ the value of the potential across the first commutating capacitor 23 drops to zero value. Current drawn by load 23 will recharge the commutating capacitor 23 in the reverse direction so that it again becomes negative at the dot during the interval of time $t_7$ to $t_8$. After time $t_8$, the voltage across the commutating capacitor $e_{23}$ becomes slightly greater than the supply voltage $E_s$ by a value determined by the value of the inductances of the resonating inductor 26 and filter inductor 21, in accordance with the following relation:

$$E = e_{23} = E_s \left( \frac{L_{26} + L_{21}}{L_{21}} \right)$$

where $L_{26}$ is the inductance of the resonating inductor 26, and $L_{21}$ is the inductance of the filter inductor 21.

At no-load condition shown by the dotted line curve in FIGURE 2a (that is, when $I_L = 0$), the voltage $e_{23}$ across the first commutating capacitor 23 rises at time $t_6$ to a value equal to approximately $E_s$, and after this time the voltage across the commutating capacitor 23 will hold the triac 11 reversed biased so that it is maintained off. Under such circumstances, the first commutating capacitor 23 must be reset by the charging inductor 29 and charging diode 31 shown in dotted outline form. These elements should be included when it is known that the circuit of FIGURE 1 will be used under conditions such that the load current $I_L$ can drop to zero value.

The circuit shown in FIGURE 3 of the drawings is a simplified version of the circuit shown in FIGURE 1 with the difference that the auxiliary commutating SCR 25 and feedback diode 28 have been omitted. A conductor 33 comprises the feedback path connected between the cushioning inductive reactor 16 and the second commutating capacitor 27. The circuit of FIGURE 3 operates in a similar fashion to the circuit of FIGURE 1, and hence its operation will not be described in detail. For the purpose of illustration, however, with the circuit of FIGURE 1, if the auxiliary commutating SCR 25 were turned on at identically the same time with the triac 11, the circuit of FIGURE 1 would then operate in an identical fashion to the circuit of FIGURE 3. About the only thing that can be said about this mode of operation is that the various steps traced through in the above description take place; however, the various voltages appearing across the two commutating capacitors, etc., become so intermingled that the description of their time relation would be difficult. It is believed, however, that the operation of the circuit shown in FIGURE 3 is essentially the same as that described with relation to the circuit of FIGURE 1.

FIGURE 4 of the drawings illustrates a new and improved power converter circuit constructed in accordance with the invention which employs integrated magnetics as discussed above, and also provides for soft commutation. The power converter circuit shown in FIGURE 4 is comprised by a unitary multi-function output transformer 33 having first and second center-tapped primary windings 34a, 34b, and 35a, 35b, respectively. The first and second primary windings 34a, 34b, and 35a, 35b are inductively coupled to a secondary winding 36 from which output power is derived from the circuit. The unitary, multi-function output transformer 33 is designed in such a manner that the various primary winding halves 34a, 34b, and 35a, 35b as well as secondary winding 36 are inductively intercoupled through leakage inductive reactance paths, and the center tap points of the winding halves 34a, 34b, and 35a, 35b are electrically interconnected through the medium of a connection 5.

Figure 6A:
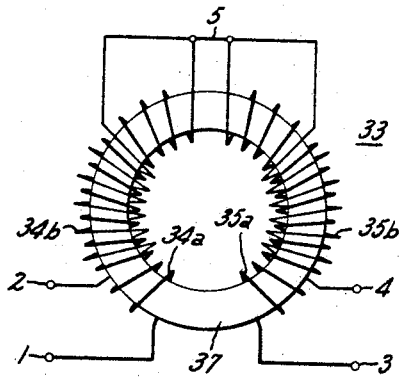
FIGURES 6a through 6d illustrate schematically the manner of construction of a unitary multi-function inductive device constructed in accordance with the principles of the present invention, and utilized in the circuit of FIGURE 4.

The design of a suitable unitary multi-function output transformer intended for use in the present invention is illustrated in FIGURES 6a through 6d of the drawings. FIGURE 6a portrays the manner in which the first and second primary winding halves 34a, 34b and 35a, 35b are formed on a single magnetically permeable core member 37, and have their center tap points interconnected by the connection 5. Input terminals 1, 2, 3, and 4 shown in FIGURE 6a correspond to the similarly marked terminals shown in FIGURE 4 of the drawings. It should be noted that the turns of the various winding halves 34a, 34b, 35a and 35b are rather loosely wound so as to insure that an amount of leakage inductive intercoupling will occur between the various turns of these windings. The amount of leakage inductive intercoupling provided is determined almost empirically during the fabrication of the transformer. After construction in the above manner, the structure of FIGURE 6a preferably has a suitable insulating tape wound over it to insure that the turns of the primary winding halves remain in place. Thereafter, the secondary winding halves 36a and 36b of secondary winding 36 are wound around the core in the manner shown in any of FIGURE 6b, FIGURE 6c or FIGURE 6d.

Figure 6B:
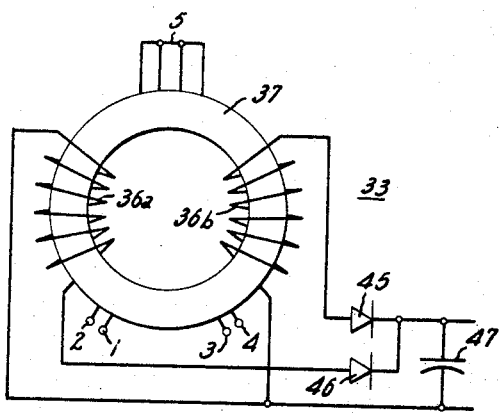
Figure 6C:
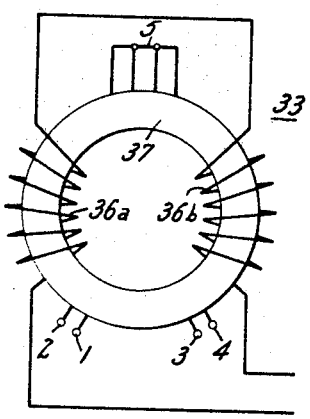
Figure 6D:
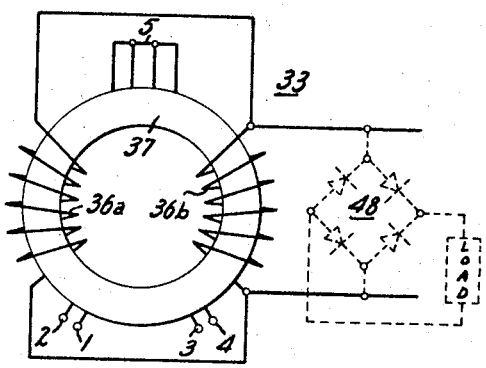

In FIGURES 6b, 6c, and 6d, the terminal points 1 through 5 correspond to similarly marked terminals in FIGURE 6a and FIGURE 4 and are noted for reference purposes. The circuit arrangement of FIGURE 6b provides a full-wave rectified output at the output terminals of the secondary winding halves 36a and 36b. For this purpose, a conventional rectifier comprised by diodes 45 and 46 and filter capacitor 47, is included. FIGURE 6c illustrates the manner in which the secondary winding halves 36a and 36b may be connected in series-circuit relationship to provide increased voltage output at the output terminals of the secondary winding halves. It should be noted that with the arrangement as shown in FIGURE 6c, an alternating current potential will be derived at the output terminals. With the arrangement shown in FIGURE 6d, the two winding halves 36a and 36b are connected in parallel-circuit relationship to provide increased current output. If desired, a rectifier bridge as shown in dotted outline form at 48 may be connected across the output terminals in order to supply direct current to a load connected across appropriate opposite terminals of the diode bridge 48. Accordingly, it can be appreciated that the output voltage derived from the power converter circuit of the present invention can be varied by appropriate connection of the secondary winding halves to supply output power in any desired form.

Returning to FIGURE 4, the first primary winding half 34a is connected through a first thyristor means comprised by a silicon-controlled rectifier 15 to one power supply terminal 18. While the thyristor means has been described as a silicon-controlled rectifier 15, it should be understood that other thyristors such as the bilateral diode switch (diac) or the bilateral triode switch (triac) could be employed equally well, and embodiments of the present invention employing such devices will be disclosed at a later point in the application. In the arrangement of FIGURE 4, however, a silicon-controlled rectifier (hereinafter referred to as a SCR) is employed. A conventional feedback diode 37 is connected in reverse polarity parallel-circuit relationship with the SCR 15. A second semiconductor power thyristor means comprised by an SCR 15' is connected between the opposite polarity power supply terminal 19 and the winding half 35a of the second primary winding adjacent the first primary winding half 34a.

A first commutating capacitor 23 is connected in series-circuit relationship with the remaining half 34b of the first primary winding with the series circuit thus formed being connected between the center tap point 5, and the first-mentioned power supply terminal 18. A second commutating capacitor 27 is connected between the center tap point 5 and the first-mentioned power supply terminal 18. The upper half of the power converter circuit shown in FIGURE 4 is completed by a first blocking diode 24 connected between the junction of the SCR 15 and winding half 34a and the junction of the first commutating capacitor 23 and winding half 34b. The first blocking diode 24 is connected in such a manner that its cathode or emitter is connected to the cathode or emitter of SCR 15.

The lower half of the power converter circuit shown in FIGURE 4 is comprised further by a third commutating capacitor 23' connected in series-circuit relationship with the remaining half 35b of the second primary winding, with the series circuit thus formed being connected between the center tap point 5 and the opposite polarity power supply terminal 19. A fourth commutating capacitor 27' is connected between the center tap point 5 and the opposite polarity supply terminal 19. A second blocking diode 24' is connected between the junction of the second SCR 15' and its winding half 35a and the junction of the third commutating capacitor 23' and its winding half 35b. A conventional feedback diode 38 is also connected in reverse polarity parallel circuit relationship with the second SCR 15'.

Figure 5:
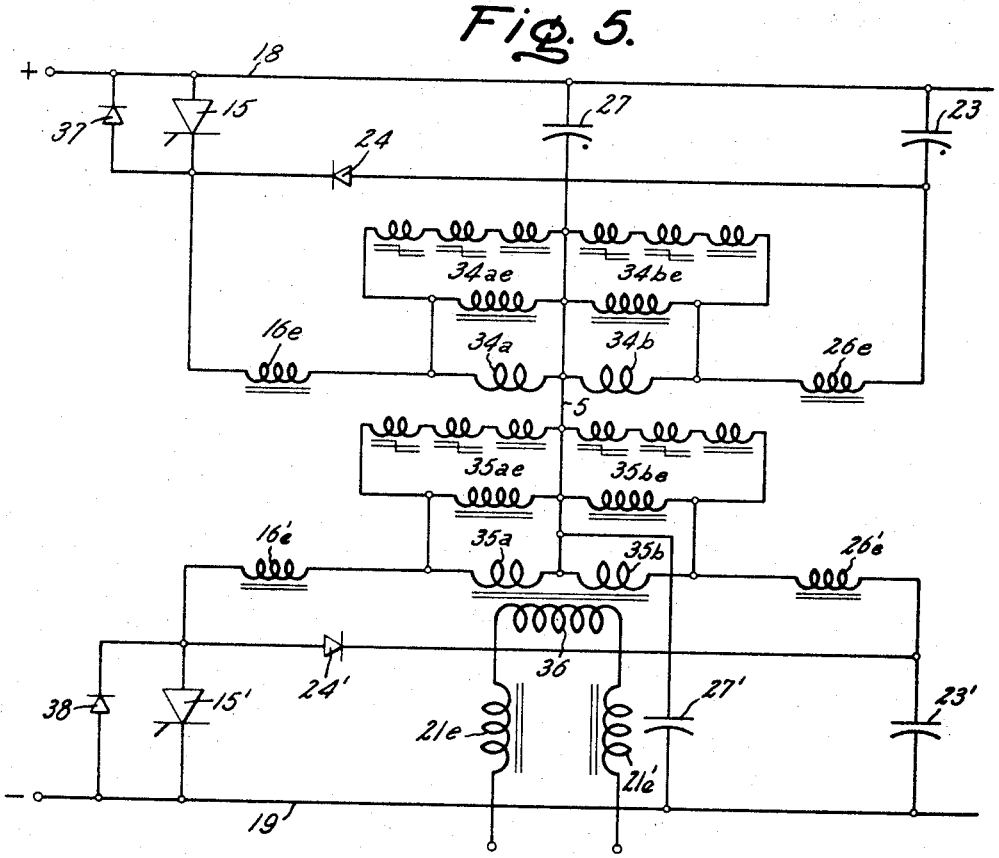
FIGURE 5 is an equivalent circuit diagram of the power converter circuit shown in FIGURE 4.

The operation of the new and improved power converter circuit shown in FIGURE 4 can best be understood in connection with the equivalent circuit diagram shown in FIGURE 5. In FIGURE 5, the equivalent circuit elements which correspond to the parts of the power converter circuit shown in FIGURE 4, have been given the same reference numeral. It might also be noted that in connection with the description of operation, it is assumed that the power supply terminals 18 and 19 are connected to a direct current power supply with the terminal 18 being positive with respect to the terminal 19. As is conventional in the art, the terminal 19 can be considered to be at ground or earth potential. In addition to the above assumptions, further assume that both SCR's 15 and 15' are in their blocking non-conducting condition, and that the circuit has just completed a cycle of operation. With the circuit in this condition, both of the commutating capacitors 23 and 27 will be charged negative at the dot. Upon turn-on of the SCR 15, charging current will be supplied to the two commutating capacitors 23' and 27' for the SCR 15' since these two capacitors will be in a discharged condition due to a previous cycle of operation. Concurrently, the charge on the capacitor 27 is oscillated through the closed-series-circuit loop including winding half 34a and its parallel leakage reactance 34ae together with the series-connected leakage reactance 16e to reverse the polarity of the charge on the commutating capacitor 27 in a fashion similar to that described with relation to the circuit shown in FIGURE 1. For this purpose, the two leakage reactances 16e and 34ae serve to adjust the total inductance in the closed-series-circuit loop so that the loop is series-tuned to the commutating frequency of the circuit. It might also be noted that the circuit is designed for operation from between 5 to 40 kilocycles so that only a very small amount of leakage reactance is required in order to obtain the desired series-tuning effect.

Upon the charge on commutating capacitor 27 being reversed in the previously described fashion, the charges appearing on both commutating capacitors 23 and 27 will then be oscillated through 180° about the closed series-circuit loop comprised by the two commutating capacitors 23 and 27, winding half 34b, its associated parallel-connected leakage reactance 34be and series-connected leakage reactance 26e. In this respect, it might be noted that the two parallel-connected leakage reactances 34ae and 34be serve to reduce the effective inductance of the winding halves 34a and 34b to accomplish the desired series-tuning effect. The series leakage reactance 26e therefore serves in the manner of the inductor 26 of the circuit configuration shown in FIGURE 1 to accomplish the desired reversal of the charge on the commutating capacitor 23. Upon the charge on capacitor 23 being reversed, blocking diode 24 is rendered conductive so as to apply a reverse polarity potential across the load terminals of SCR 15 causing it to turn off.

The wave forms for the above operation are similar somewhat to those shown in FIGURE 2 of the drawing with the exception that the two oscillations of the charge on the commutating capacitors 27 and 23 described above are somewhat intertwined in time and difficult to portray. The resultant effect, however, is to turn off the SCR 15. Upon turn-off of SCR 15, the commutating capacitor 23 serves to limit the rate of rise of reapplied forward voltage across this SCR to thereby achieve a soft commutation effect. Similarly, upon turn-on of the SCR 15, the leakage reactance 16e serves to limit the rate of rise of current therethrough ($di/dt$) so as to thereby achieve the desired current cushioning. Output oscillations produced in the secondary winding 36 will be filtered somewhat by filter inductive reactances 21e and 21e' which are provided by leakage inductive reactance between the primary and the secondary windings. The leakage reactances 16e, 34ae, 34be and 26e are all provided by leakage reactance between the two primary winding halves 34a, 34b, 35a, and 35b and the secondary winding 36.

After the SCR 15 has been commutated off in the above-described manner, the SCR 15' is turned on by the application of a gating-on signal to its control gate from a suitable source of gate signals. Upon turn-on of the SCR 15', the lower half of the power converter circuit shown in FIGURES 4 and 5 and comprised by the circuit elements with a prime added to their reference numeral, will function in a manner entirely similar to that described above with relation to the upper half of the circuit. The only difference between the functioning of the two halves of the circuit is that the output potential developed in the secondary winding 36 upon turn-on of the SCR 15', and its subsequent commutation off, will have a reverse polarity with respect to that developed due to SCR 15. As a consequence, it can be appreciated that an alternating current potential will be developed across the output terminals of the secondary winding 36.

Figure 7A:
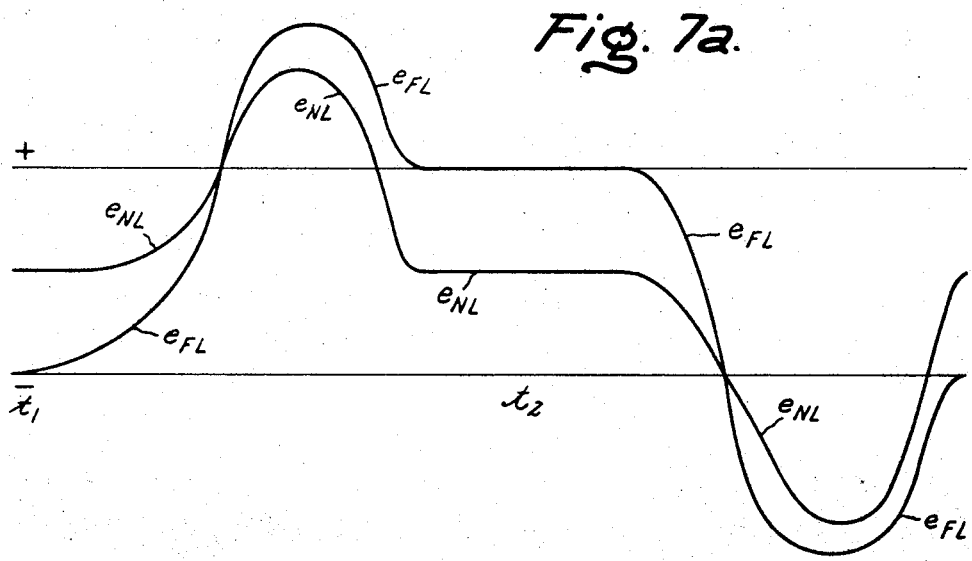
FIGURES 7a and 7b are a series of voltage versus time wave shapes.

FIGURE 7a of the drawings illustrates the wave form of the output voltage produced at the output of the circuit shown in FIGURE 4 for various changed load conditions. If the circuit is operated under full-load conditions, the output wave form will appear as shown in the curve identified as $e_{FL}$ where $t_1$ is the time at which SCR 15 is turned on and $t_2$ is the time when SCR 15' is turned on. The curve marked $e_{NL}$ illustrates the wave form of the output voltage appearing across the output transformer if the circuit is operated with no-load and is either open-circuited or short-circuited. Thus, it can be appreciated that the circuit is self-protecting in that no potentially damaging large voltage surges occur which could result in damage to the thyristors. The reason that the circuit operates in this manner is that in the frequency ranges under consideration at which the circuit is designed to operate, the operating frequency and the commutating frequency are so close together that energy trapped in the circuit that might be caused by a short circuit or an open circuit, can be and is stored in the commutating elements during each conductive interval of the SCR's without doing damage.

Figure 7B:
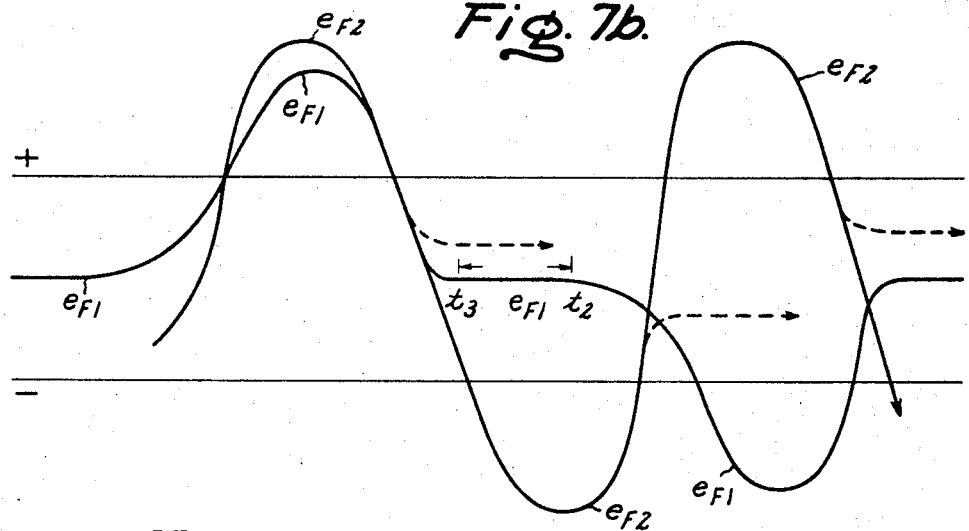
Figure 7C:
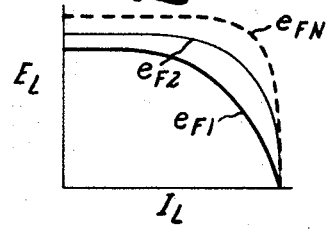
FIGURE 7c is a voltage versus current curve, illustrating the operating characteristics of the circuit shown in FIGURE 4.

FIGURE 7b of the drawings illustrates the manner in which the output power derived from the circuit can be varied by varying the relative firing angle of the two SCR's 15 and 15'. As was stated in the above description, it was assumed that the SCR 15' was not gated-on until such time that the SCR 15 had been completely commutated off. Operation of the circuit in this manner is illustrated by the curve $e_{F1}$ wherein at time $t_3$ the SCR 15 is commutated off and at time $t_2$, the SCR 15' is gated-on. By varying the interval of time between $t_3$ and $t_2$, the output power developed by the circuit can be varied all the way down to substantially zero output power. In order to increase the power output in the circuit, the time $t_2$ at which the SCR 15' is gated-on may be advanced so as to coincide with or even be a small period of time in advance of the time $t_3$ when the SCR 15 is completely commutated off. There is a limitation, however, of how far the firing angle of the SCR 15' can be advanced ahead of complete commutation off of the SCR 15. Operation of the circuit in this manner is illustrated by the voltage wave shape marked $e_{F2}$ wherein the time of firing of the SCR 15' is coincident with the commutation off of the SCR 15. FIGURE 7c illustrates the load voltage versus load current operating characteristic of the circuit arrangement of FIGURE 4 and illustrates the effect of changes on the relative firing angles of the SCR's on the output power derived from the circuit. The dotted curve marked $e_{FN}$ illustrates the characteristic obtained when the firing angle of the SCR 15' is advanced so much that the circuit operates in an auto-impulse fashion, wherein turn-on of the SCR 15' is previous to commutation off of the SCR 15, and vice versa. Even when operated in this manner, however, commutation is achieved substantially as described above.

Figure 8:
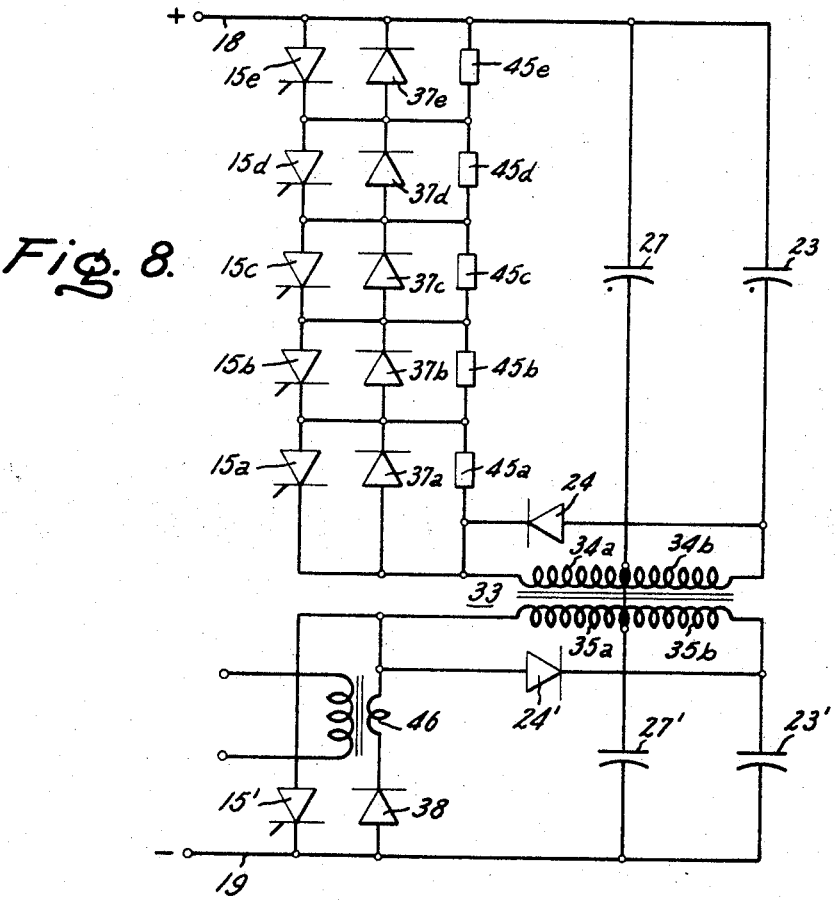
FIGURE 8 is a schematic circuit diagram of a modified form of the circuit shown in FIGURE 4 which employs a plurality of series-connected thyristors.

FIGURE 8 of the drawings illustrates a modified version of the circuit shown in FIGURE 4 wherein a plurality of silicon-controlled rectifiers 15a through 15e are connected in series-circuit relationship, and are adapted to be gated-on concurrently. Each of the SCR's 15a through 15e has an associated reverse polarity parallel connected feedback diode 37a through 37e and a load-sharing resistor 45a through 45e connected parallel with it. Connection of multiple SCR's in this manner is well known in the art in order to increase the voltage capability of a circuit employing thyristors. Insofar as the operation of the circuit of FIGURE 8 is concerned, this circuit will operate in similar fashion to the circuit shown in FIGURE 4, and hence a further description thereof is believed unnecessary. In addition, it might be noted that a transformer 46 is provided having secondary winding connected in series with the feedback diode 38. This arrangement may be provided for certain circuit arrangements where it is desired to apply to the diode 38a lock out signal pulse coincident with turning-on of the SCR 15' to assure that diode 38 is not conducting during intervals that the SCR 15 is conducting.

Figure 9:
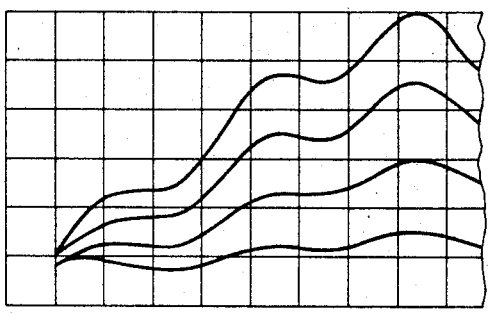
FIGURE 9 is a series of voltage versus time wave shapes illustrating the operating characteristics of the circuit shown in FIGURE 8.

FIGURE 9 illustrates the wave forms of the voltages appearing across the load-sharing resistors 45a through 45e. From a consideration of FIGURE 9, it can be appreciated that the voltage appearing across each of the individual load-sharing resistors 45 are added in series to greatly increase the voltage capability of the circuit. Output power developed by the converter circuit of FIGURE 8 is derived from a secondary winding (not shown) but which would be similar to the secondary winding 36 employed in the FIGURE 4 circuit arrangement.

Figure 10:
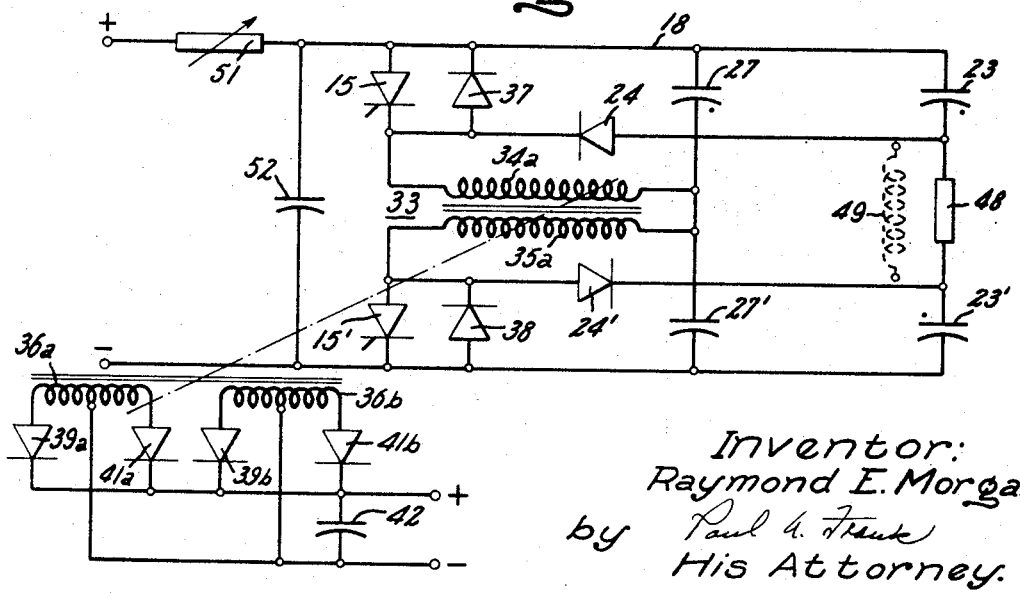
FIGURE 10 is a schematic circuit diagram of a form of a new and improved power converter circuit utilizing both integrated magnetics and soft commutation which is suitable for use at the lower power ratings.

FIGURE 10 illustrates a low-cost form of a new and improved power converter constructed in accordance with the invention which is suitable for use at lower power ratings. The circuit arrangement of FIGURE 10 is similar in many respects to the circuit of FIGURE 4 with the exception that the unitary multi-function inductive means 33 is comprised by an output transformer having two primary winding portions 34a and 35a which are not center-tapped in the manner of the FIGURE 4 circuit arrangement. In addition, the dot sides of the two commutating capacitors 23 and 23' are interconnected through a non-capacitive impedance element such as a resistor 48, or the inductor 49 shown in dotted outline form. If the direct current power supply with which the power converter shown in FIGURE 10 is to be used has not been filtered, then it may be desirable to include a filter comprised by the variable resistor 51 (or an inductor not shown) and capacitor 52 connected between the power supply terminals 18 and 19 and the unfiltered source of direct current potential. Additionally, because of the nature of the FIGURE 10 circuit arrangement, it would be desirable to operate the two secondary winding halves 36a and 36b in a balanced fashion by the provision of the rectifying diodes 39a, 39b, and 41a, 41b connected in the manner shown together with suitable center tap connectors across the filter capacitor 42.

The operation of the circuit arrangement shown in FIGURE 10 is similar to that shown in FIGURE 4 with the exception that after the charge on the commutating capacitor 27 has been oscillated through 180° so that it is positive on the dot side of the capacitor, oscillation of the charge on the commutating capacitor 23 so as to reverse its polarity is somewhat different. In the circuit arrangement of FIGURE 10, after capacitor 27 has reversed its charge, the charge on both of these capacitors will be oscillated through 180° through the closed loop circuit comprised by each of the capacitors 23 and 27, the non-capacitive impedance 48 or 49 blocking diode 24' and the inductive reactance of output transformer 33. Again, the inductive reactance of the primary winding 35a has connected in parallel with it the leakage inductive reactance between the two primary windings 34a and 35a and to the secondary winding 36 so that the total inductive reactance in the circuit serves to series-tune this closed loop circuit to the commutating frequency of the circuit. In all other respects, the circuit of FIGURE 10 operates in a manner similar to that of FIGURE 4.

Figure 11:
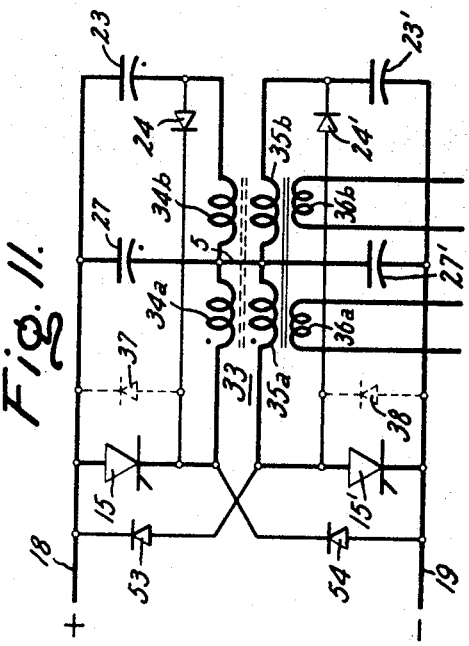
FIGURE 11 is a schematic circuit diagram of a form of the new and improved power converter wherein voltage clamping of the thyristors is achieved.

FIGURE 11 illustrates an embodiment of the invention which is similar to that of FIGURE 4 with the exception that clamping diodes 53 and 54 are provided. The clamping diode 53 is connected in series-circuit relationship with the SCR 15' across the power supply terminals 18 and 19. It should be noted, however, that the clamping diode 53 is connected in a reverse polarity relationship with respect to SCR 15' in that the anode of diode 53 is connected to the anode of SCR 15' and the cathode of the diode is connected to power supply terminal 18. Clamping diode 54 similarly is reversely connected in series-circuit relationship with the SCR 15, but has its cathode connected to the cathode of SCR 15. By reason of this arrangement, the two clamping diodes 53 and 54 will assure that the voltage developed across each of the SCR's 15 and 15' will never rise above the value of the power supply potential E. Because of the provision of the clamping diodes 53 or 54, the circuit arrangement of FIGURE 11 may or may not include the feedback diodes 37 and 38 shown in dotted outline form. In all other respects, the circuit of FIGURE 11 functions in the same manner as that of FIGURE 4, and a further description of its operation is believed unnecessary.

Figure 12:
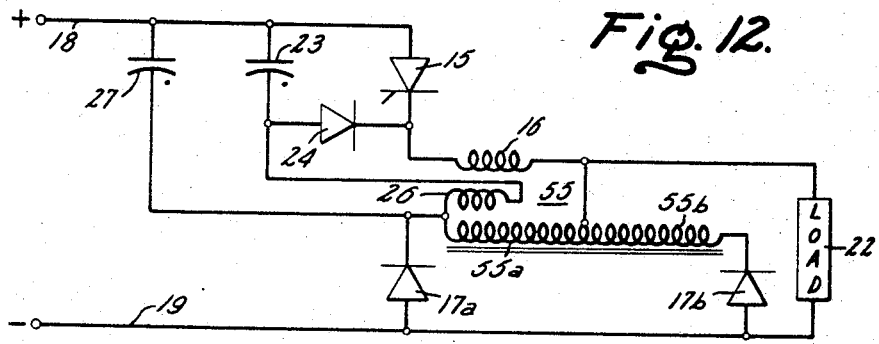
FIGURE 12 is a schematic circuit diagram of still a different form of power converter circuit constructed in accordance with the invention which employs an autotransformer in its output.

FIGURE 12 of the drawings illustrates a time-ratiocontrol power circuit (or chopper) constructed in accordance with the invention and provides both soft commutation and employs the integrated magnetic technique of circuit fabrication. The circuit arrangement of FIGURE 12 operates in a somewhat similar fashion to the circuit shown in FIGURES 1 and 3 but differs therefrom in that it employs integrated magnetics in its construction. In considering the circuit arrangements of FIGURE 12, it should be kept in mind that the inductive device 55 employed therein is comprised by a plurality of windings 16, 26, 55a and 55b all wound on a single magnetically permeable core member so that in effect the device 55 comprises a unitary, multi-function inductive device.

The time-ratio control circuit of FIGURE 12 is further comprised by an SCR 15 and load 22 connected in series-circuit relationship with a winding portion 16 of the unitary multi-function inductive device 55 across the power supply terminals 18 and 19. A first coasting rectifier 17a is connected in series-circuit relationship with a winding portion 55a across a second series circuit comprised by a second coasting rectifier 17b and winding portion 55b. Both of the series circuits thus comprised are connected in parallel with the load 22. A first commutating capacitor 23 is connected in series-circuit relationship with a blocking diode 24 across the SCR 15 and the juncture of the commutating capacitor 23 and blocking diode 24 is connected through a winding portion 26 of the untiary multi-function inductive device and a second commutating capacitor 27 back to power supply terminal 18. The juncture of the commutating capacitor 27, first coasting rectifier, 17a, winding portion 55a and winding portion 26 forms a common connection point for all of these elements.

In operation, the circuit of FIGURE 12 functions as follows. In considering this description, it should be kept in mind that the function of a time-ratio control circuit (or chopper) is to proportionally control the power supplied to the load device 22 by controlling the on time of the SCR 15 in such a fashion that the load demands are satisfied. With the circuit arrangement of FIGURE 12, the on time of SCR 15 is fixed since turn-on of the SCR also automatically initiates its commutation. Hence, control of power supply to the load is achieved by varying the number of times per second that the SCR 15 is turned on and then subsequently commutated off.

Assuming the semi-conductor 15 to be in its blocking non-conducting condition, then load current will be circulated through the load by coasting rectifiers 17a and 17b and the two winding haves 55a and 55b. Circulation of this load current will be due to the effect of the filter inductance provided by the leakage inductive reactance designed into the unitary, multi-function inductive device 55. Commutating capacitors 23 and 27 will then have been charged to the full potential of the direct current supply with polarities negative at the dot. Upon SCR 15 being turned on, conduction through the coasting rectifiers 17a and 17b stops, and the energy trapped in the cushioning inductor 16 is circulated into the commutating capacitor 27 to reverse the polarity of the charge thereon. To accomplish this, the total reactance of the cushioning inductor 16, winding half 55a and the leakage reactance of the winding half 55a and inductor 16 are designed such that the total inductive reactance in the circuit is series resonant with the commutating capacitor 27 at the commutating frequency of the circuit. Upon the charge on capacitor 27 being reversed in polarity, an oscillation through 180° of the charges on both capacitors 23 and 27 will occur in the closed series circuit loop comprised of the two commutating capacitors 23 and 27 and the resonating inductor part 26. Here again, the resonating inductor 26 is designed so that the close-series circuit loop is series resonant at the commutating frequency. Upon reversal of the charge on the commutating capacitor 23, the potential across this capacitor goes positive at the dot side causing blocking diode 24 to become conductive and apply a reverse polarity potential across the load terminals of SCR 15, thereby turning it off. This then completes one cycle of operation. It might also be noted that the cushioning inductor portion 16 and winding half 55b comprise an auto transfer so that step-up or step-down of the voltage applied to the load 22 can be achieved. Accordingly, it can be appreciated therefor that the single unitary multi-fashion inductive device 55 provides all of the cushioning, resonating, filtering, and transformer inductance required by the circuit.

Figure 13:
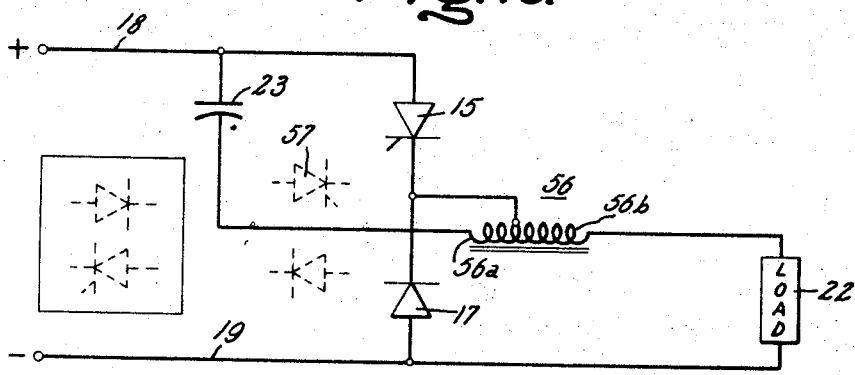
FIGURE 13 is a schematic circuit diagram of a new and improved power converter circuit employing integrated magnetics only without providing soft commutation.

FIGURE 13 illustrates a new and improved time ratio control power circuit constructed in accordance with the present invention wherein integrated magnetics are employed, but soft commutation is not provided. In the circuit arrangement of FIGURE 13, a load 22 and SCR 15 are connected in series-circuit relationship across the pair of power supply terminals 18 and 19 through the medium of a unitary, multi-function inductive device 56. The multi-function inductive device 56 is wound on a single magnetically permeable core member and has two winding portions 56a and 56b with the winding turns of these portions also being inductively intercoupled through leakage flux. The winding portion 56b is connected in series with the SCR 15 and load 22 and together with its leakage reactance functions generally as a filter inductance in the time ratio control circuit while load current is being circulated through the load and coasting rectifier 17. The winding portion 56a and its associated leakage reactance is connected in series-circuit relationship with the commutating capacitor 23 across the SCR 15.

In operation, while SCR 15 is in its blocking, non-conducting condition, the commutating capacitor 23 will be charged to the full potential of the direct current supply with its polarity negative at the dot. Thereafter, upon turn-on of the SCR 15, the potential across capacitor 23 will oscillate through 180° so that it then becomes positive at the dot side. This oscillation takes place through the closed series circuit loop comprised by the commutating capacitor 23, the winding portion 56a, and its associated leakage inductive reactance, and SCR 15. The winding portion 56a and its associated leakage inductive reactance is designed such that this close-series circuit loop is tuned to series resonance at the commutating frequency. Upon reversal of the polarity of the charge across capacitor 23, SCR 15 will be commutated off, thereby completing one cycle of operation of the circuit. If desired, a current blocking device such as a diode 57 and a reverse polarity parallel connected SCR 57' (shown in dotted outline form) may be connected a and b in the conductor (in place of the straight through connection shown in solid line) interconnecting commutating capacitor 23 and winding portion 56a with the polarities indicated. By the inclusion of diode 57 and SCR 57', improved isolation of the operation of the various elements of the circuit will be obtained. If desired, the improved isolation could be obtained by the reversal of the polarities of the diode 57 and SCR 57' as indicated in the square sketched to the left of FIGURE 13. Whether this alternative connection, or that first mentioned, is employed in the circuit is determined by the nature of the load 22. If the load 22 is relatively stable, that is it changes only slightly and very gradually, then the first mentioned alternative arrangement should be employed. However, if the nature of the load 22 is such that it varies quickly and widely from say substantially no load or light load to full in short intervals of time, then the alternative arrangement shown in the square to the left of FIGURE 13 should be used. With such alternative arrangements, the commutating capacitor 23 is charged to the supply potential $E_s$ through diodes 57 through load 22, or during the interval that coasting rectifier 17 is conducting. Commutation is then initiated by gating on the SCR's 57'. It should also be noted that in the circuit arrangement of FIGURE 13, the leakage inductive reactance will provide sufficient inductive reactance to provide $di/dt$ cushioning during turn-on of the SCR 15. However, there is no equivalent $dv/dt$ protection provided in the circuit of FIGURE 13 to that obtained with the circuits previously described.

Figure 14:
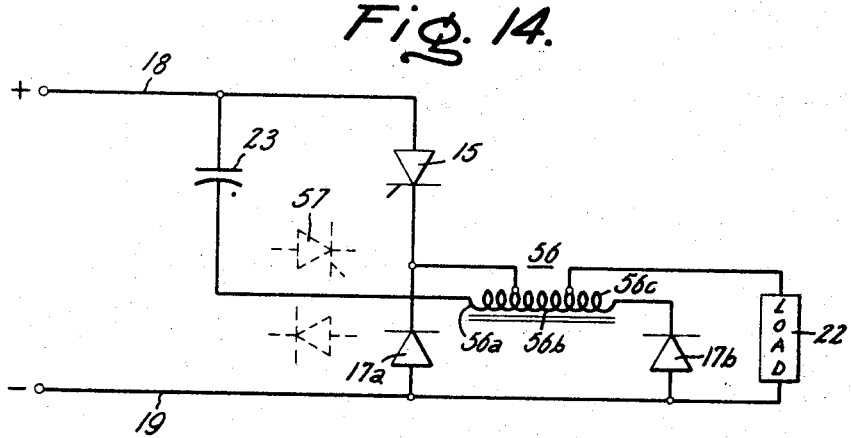
FIGURE 14 is a schematic circuit diagram of still a different form of the circuit arrangement illustrated in FIGURE 13.

FIGURE 14 of the drawings illustrates an embodiment of the invention wherein the unitary, multi-function inductive device 56 is connected in such a manner as to provide the additional function of output signal transformation. Otherwise, the circuit of FIGURE 14 is the same as the circuit shown in FIGURE 13 and would operate in the same manner. In the circuit arrangement of FIGURE 14, the conductor leading to load 22 is connected to an intermediate tap point on inductive device 56 so as to divide it into three winding portions 56a, 56b, and 56c. By connecting the inductive device 56 in this manner, the two portions 56b and 56c will function as an auto transformer connected in the output of the SCR 15 to provide either step-up or step-down of the voltage applied to load 22. The winding portion 56b also functions as a filter inductance for the circuit. In all other respects, the circuit of FIGURE 14 would operate identically to the circuit shown in FIGURE 13. It might also be noted that an additional control element, such as the diode 57 could be included in the circuit arrangement of FIGURE 14 in a manner similar to that described with relation to the FIGURE 13 circuit.

Figure 15:
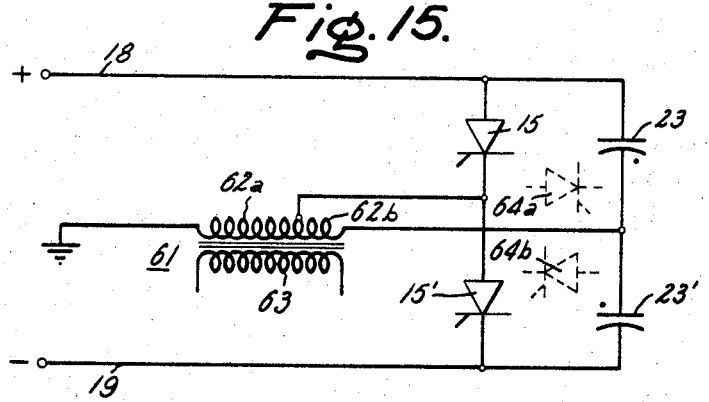
FIGURE 15 is a schematic circuit diagram of a power inverter configuration which employs integrated magnetics.

FIGURE 15 of the drawings illustrates a low-cost power inverter circuit constructed in accordance with the invention which employs integrated magnetics, but does not provide for complete soft commutation of the thyristors. The inverter circuit shown in FIGURE 15 is comprised by a pair of SCR's 15 and 15' connected in series-circuit relationship between the pair of power supply terminals 18 and 19. A pair of commutating capacitors 23 and 23' are connected in series circuit relationship across the power supply terminals 18 and 19 in parallel with SCR's 15 and 15'. A unitary, multi-function inductive device 61 has its primary winding comprised by the winding portions 62a and 62b connected in series between a ground terminal and the mid tap point of the commutating capacitors 23 and 23'. The intermediate tap point on the primary winding 62a, 62b is connected to the junction of the SCR's 15 and 15'. An alternating current output signal is derived from the secondary winding 63 of inductive device 61.

In operation, the circuit of FIGURE 15 functions in the following manner. During alternate conducting intervals of the SCR's 15 and 15', the commutating capacitors 23' and 23, respectively, will be charged alternately in a manner such that the dot side of the commutating capacitor 23 is negative and the dot side of the commutating capacitor 23' is positive. When the SCR 15 is turned on, current will be supplied to the winding portion 62a and will result in the production of one-half of the output oscillatory signal derived from the secondary winding 63. Concurrently with the production of this output signal, the charge on the commutating capacitor 23 will be oscillated through 180° through the closed series circuit loop comprised by commutating capacitor 23, winding portion 62b and SCR 15. The winding portion 62b is designed so that it is series resonant at the commutating frequency with the commutating capacitor 23. Upon the charge on the commutating capacitor 23 being reversed, SCR 15 will be commutated off. The reverse process takes place with respect to the SCR 15' and its associated commutating capacitor 23' to provide the negative half-cycle of the alternating current output signal. If it is desired to exercise independent control over the commutation period of the SCR's 15 and 15', then auxiliary commutating SCR's 64a and 64b may be inserted in the circuit and provided with suitable auxiliary gating-on signals to initiate the commutation interval. These devices are illustrated in dotted outline form to show that it is an alternative form of the circuit shown in FIGURE 15. It is, of course, essential that these auxiliary commutating SCR's 64a and 64b be inserted in the conductor leading from the winding portion 62 to the junction point of the commutating capacitors 23 and 23'. It is to be noted, however, that the unitary, multi-function inductive device 61 serves as both an output transformer and provides the resonating inductance required by the commutation circuit. In addition, some filtering of the output signal will be provided by the inductance in the output transformer, as well as $di/dt$ cushioning during turn-on of the SCR's.

Figure 16:
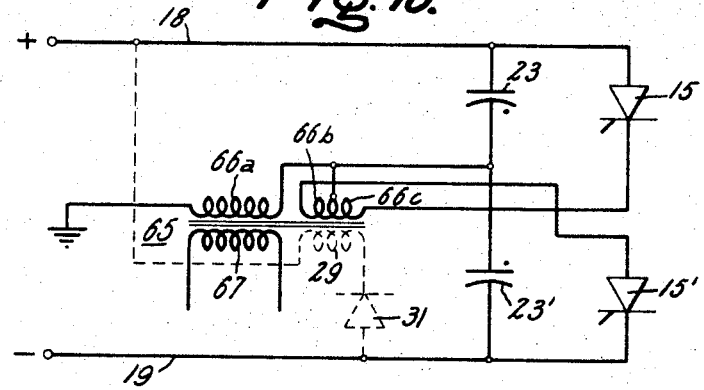
FIGURE 16 is a schematic circuit diagram of a power inverter circuit employing new auto-impulse commutation and using integrated magnetics.

FIGURE 16 of the drawings illustrates a new and improved power inverter circuit employing autoimpulse type of commutation, and utilizing integrated magnetics in accordance with the teachings of the present invention. The autoimpulse inverter circuit shown in FIGURE 16 of the drawings employs a unitary, multi-function inductive device 65 having primary winding portions 66a, 66b, and 66c inductively coupled to a secondary winding 67 from which alternating current output signals are derived. This unitary, multi-function inductive device can be fabricated in a manner similar to that described with relation to FIGURE 6 of the drawings. In the inverter circuit shown in FIGURE 16, a pair of SCR's 15 and 15' are connected in series-circuit relationship with the winding portions 66b and 66c across the pair of power supply terminals 18 and 19. A pair of commutating capacitors 23 and 23' are connected in series-circuit relationship across the power supply terminals 18 and 19 in parallel with the SCR's 15, 15' and winding portions 66b and 66c. The juncture of the commutating capacitors 23 and 23' is connected to a mid-tap point of the winding portions 66b and 66c and is connected through winding portion 66a to ground. If it is desired to utilize the circuit arrangement of FIGURE 16 under conditions where there would be no load, then an additional winding portion 29 may be provided on the unitary multi-function inductive device 65. This additional winding portion 29 is shown in dotted outline form to show its alternative nature, and is connected in series circuit relationship with a diode 31 across the power supply terminals 18 and 19. Under no-load conditions, the additional winding 29 and diode 31 will serve to pre-charge the commutating capacitors 23 and 23' in the manner discussed with relation to the circuit shown in FIGURE 1 of the drawings.

In operation, the circuit of FIGURE 16 functions in a manner such that if the SCR 15 is conducting, turn-on of the SCR 15' will operate to commutate off the SCR 15 and vice versa. Assuming that the commutating capacitors 23 and 23' are charged such that the dot side of the capacitor 23 has a negative polarity, the dot side of the capacitor 23' has a positive polarity, and that the SCR 15 is conducting. Under these conditions, upon turn-on of the SCR 15', the charge on the commutating capacitor 23 will be oscillated through 180° to reverse the polarity of the charge on the dot side. This reversal in polarity of the charge on commutating capacitor 23 is achieved through the closed series circuit comprised by commutating capacitors 23', SCR 15', both winding portions 66b and 66c, and SCR 15. In this respect, it should be noted that the two winding portions 66b and 66c are designed such that their total inductance is tuned to series resonance with capacitor 23' and capacitor 23. Reversal of the polarity of the charge on the commutating capacitor 23 results in turning off the SCR 15. During the alternate half-cycles, the reverse effect takes place with respect to the SCR 15'. The alternate conducting periods of the SCR's 15 and 15' thus will produce an alternating current potential in the output winding 67. With respect, however, to the unitary, multi-function inductive device 65, it should be noted that in addition to serving as an output transformer, it provides all the resonating inductance required by the commutation elements of the circuit.

Figure 17:
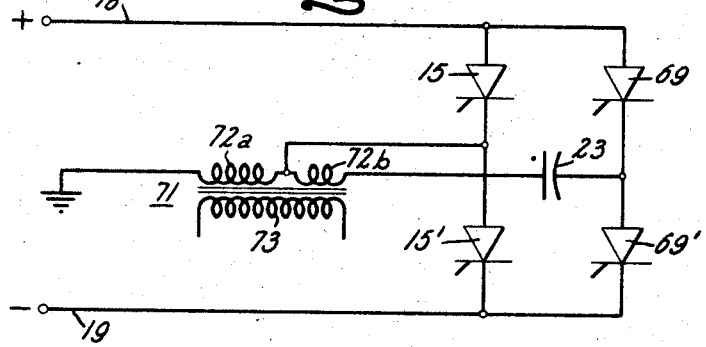
FIGURE 17 is a schematic circuit diagram of a power inverter circuit employing MacMurray commutation and utilizing the integrated magnetics technique made possible by the present invention.

FIGURE 17 of the drawings illustrates a new and improved power inverter circuit constructed in accordance with the invention which employs integrated magnetics and utilizes MacMurray commutation. The circuit of FIGURE 17 is comprised by a pair of load-current-carrying SCR's 15 and 15' connected in series-circuit relationship across the pair of power supply terminals 18 and 19. A pair of auxiliary commutating SCR's 69 and 69' similarly are connected in series circuit relationship across the power supply terminals 18 and 19 in parallel with the load-current-carrying SCR's 15 and 15'. A commutating capacitor 23 is provided which has one of its terminals connected to the junction of the auxiliary commutating SCR's 69 and 69'. The remaining terminal of commutating capacitor 23 is connected through a winding portion 72b of a unitary, multi-function inductive device 71 to the junction of the load-current-carrying SCR's 15 and 15'. The junction of the load-current-carrying SCR's 15 and 15' is also connected back through a winding portion 72a of inductive device 71 to ground. Output power is derived from the circuit from across the secondary winding 73 that is inductively coupled to primary winding portions 72a and 72b. Here again, the unitary, multi-function inductive device may be fabricated along lines similar to those illustrated in FIGURE 6 of the drawing.

In the operation of the circuit shown in FIGURE 17, the load-current-carrying SCR's 15 and 15' are alternately turned on and off to supply load-current flow through the primary winding portion 72a. This results in the production of an alternating current output in the secondary winding 73. During operation of the circuit, however, it is essential that the load-current-carrying SCR 15' not be turned on until such time that the load-current SCR 15 has been commutated off, and vice versa. In order to commutate off the SCR 15, the auxiliary commutating SCR 69 is turned on. Upon turn-on of the auxiliary commutating SCR 69, the charge of the commutating capacitor 23 which is normally negative at the dot side is oscillated through 180° by the closed series loop comprised by auxiliary SCR 69, load current SCR 15 and the winding portion 72b which is series resonant with commutating capacitor 23 at the commutating frequency of the circuit. The result is to reverse the polarity of the charge on the commutating capacitor 23, thereby causing the load-current-carrying SCR 15 to turn off. On the opposite half-cycle, a similar process takes place with respect to the load-current SCR 15' and auxiliary commutating SCR 69' with the exception that the polarity of the potentials across the commutating capacitor 23 are reversed. It should be noted, however, that here again, the unitary, multi-function inductive device 71 operates not only as an output transformer, but supplies the resonating inductance required by the commutating circuit. Additionally, it will provide some filtering to the output signal developed across the secondary winding 73.

Figure 18:
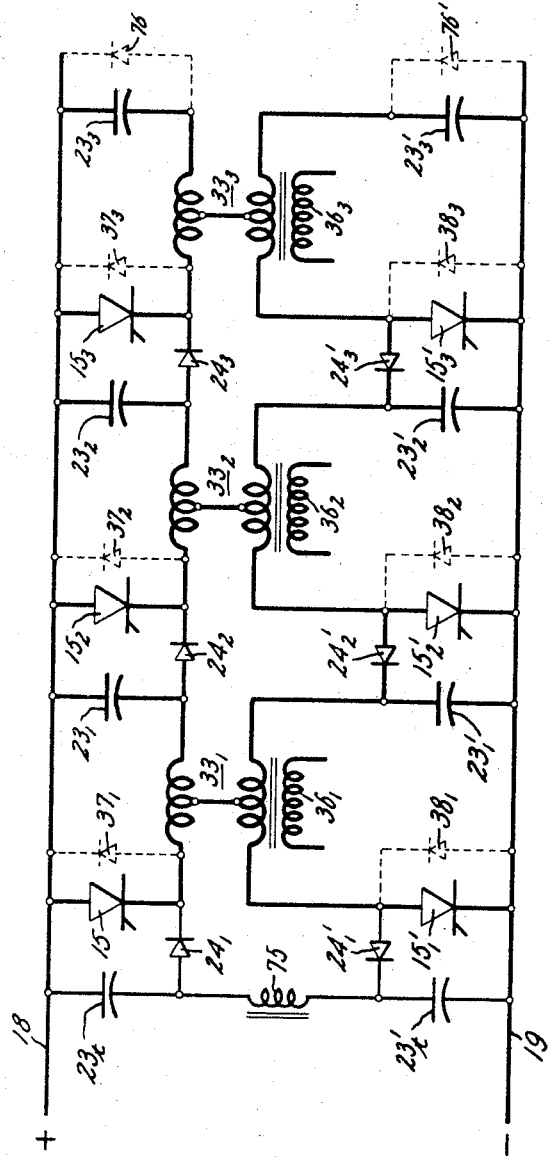
FIGURE 18 illustrates a three-phase power converter constructed in accordance with the present invention which provides both soft commutation and utilizes integrated magnetics.

FIGURE 18 of the drawings illustrates a three-phase power converter constructed in accordance with the invention. The three-phase power converter shown in FIGURE 18 is in actuality comprised of three single-phase power converter circuits of the type illustrated and described with relation to FIGURE 4 of the drawings. Each of the single-phase power converters which make up the three-phase over-all system is comprised by a unitary multi-function inductive device $33_1$, $33_2$ or $33_3$ connected in circuit relationship with its associated load-current-carrying SCR's and commutating capacitors in precisely the same manner as was described with relation to FIGURE 4. Proper interaction amongst the several phases of the circuit, however, is assured by appropriately connecting the blocking diode means $24_1$, $24_2$, $24_3$, etc. of the several phases to the next-adjacent phase. This connection is accomplished in such a manner that the semi-conductor power thyristor means of any given phase is connected to the commutating capacitor of the next-adjacent phase. For example, the power thyristor $15_2$ of the second phase is connected through blocking diode $24_2$ to the commutating capacitor $23_1$ of the next-adjacent or first phase. In addition, a pair of auxiliary commutating capacitors $23_t$ and $23_t'$ are provided which are connected in series-circuit relationship with a non-capacitive impedance element comprised by inductor 75, with the series circuits thus comprised being connected across the power supply terminals 18 and 19. The blocking diode means $24_1$ of one of the terminal phases; namely, the first phase is then connected between the power thyristor $15_1$ and the auxiliary commutating capacitor $23_t$. Similarly, the blocking diode means $24_1'$ of power thyristor $15_1'$ is connected through the auxiliary commutating capacitor $23_t'$. By interconnecting the several phases of the multi-phase converter in the above-described fashion, the energy stored in the auxiliary commutating capacitors $23_t$ and $23_t'$ will serve to commutate off the first phase, the energy stored in the commutating capacitors of the first phase will serve to commutate off the second phase and so on through the multi-phase system, thereby assuring proper coaction of the several phases. With respect to the energy stored in the commutating capacitors in the last phase of the multi-phase system, diode means 76 and 76' indicated in dotted outline form may be connected across these capacitors. The diode means 76 and 76' will then serve to bleed off the energy trapped in these capacitors as a result of the last phase running through an operation cycle. In all other respects, the individual phases of the multi-phase system shown in FIGURE 18 operate in precisely the same manner as the circuit shown in FIGURE 4 of the drawing, and a further detailed description of their manner of operation is believed unnecessary.

Figure 19A:
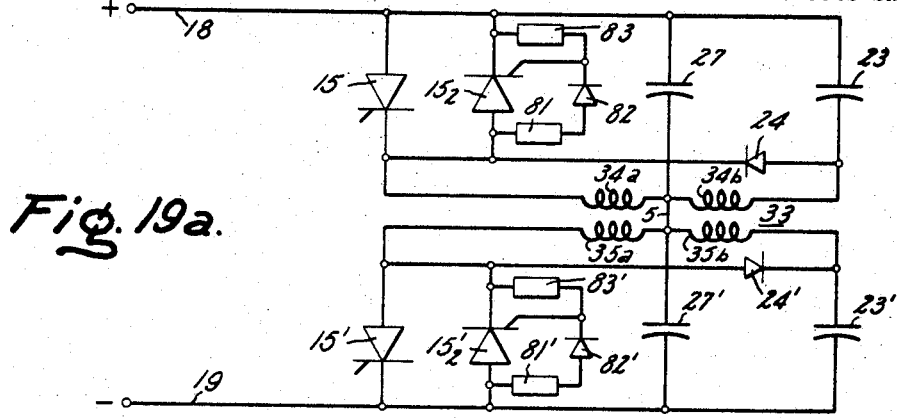
FIGURES 19a through 19c illustrate modified forms of the circuit arrangement shown in FIGURE 4 wherein back-to-back SCR's, triacs, and diacs are employed as the thyristor elements of the circuit.

FIGURE 19a of the drawings illustrates a modification of the circuit arrangement shown in FIGURE 4, wherein reverse polarity connected additional SCR's $15_2$ and $15_2'$ are provided, and are connected in reverse polarity parallel-circuit relationship with the SCR's 15 and 15'. The circuit configuration shown in FIGURE 19a is intended for use in those applications where it would appear desirable to pump electric power from the load back into the power supply source connected to the power supply terminals 18 and 19. This occasion may arise, for example, in the application of the circuit to the control of D-C traction motors and the like, where the vehicle driven by the traction motors is coasting downhill and is generating electric power which must be dissipated. With the circuit arrangement of FIGURE 19a, it would be possible to pump this power back into the power supply source for distribution to other loads, thereby conserving the energy. For this purpose, the reverse polarity connected SCR $15_2$ has an automatic gating circuit connected thereto which is comprised by a resistor 81, a diode 82, and a second resistor 83 connected in series-circuit relationship across its load terminals. This series circuit, in fact, comprises a resistor voltage divider with a blocking diode. The control gate of the SCR $15_2$ is connected between the juncture of the blocking diode 82 and resistor 83. As a consequence of the blocking diode 82 having its anode in effect connected to the anode of the SCR $15_2$, gating-on signal pulses will be supplied to the gate of the SCR $15_2$ only when the potential of the anode of SCR $15_2$ is positive with respect to the potential applied to its cathode. This can only occur when power is being supplied back from the load toward the direct current power supply source connected across terminals 18 and 19. The auxiliary reverse-connected SCR $15_2'$ is provided with a similar gating-on circuit comprised by the elements 81', 82' and 83'. The auxiliary SCR's $15_2$ and $15_2'$ are commutated off by the same commutating elements employed to commutate off the SCR's 15 and 15'. Operation of the circuit in this mode, however, will reverse the polarity of the potentials appearing across the components of the commutating circuit. Otherwise, the circuit will operate in precisely the same manner as the circuit of FIGURE 4, and a further description of the operation is believed unnecessary. It can be appreciated, however, that the circuit arrangement of FIGURE 19 can be operated in two modes. The first mode is when the SCR's 15 and 15' are alternately conductive to supply power from the power supply terminals 18 and 19 to the load. The other mode of operation is when the reverse polarity-connected SCR's 15₂ and 15₂' are alternately operated to pump power from the load back into the power supply source.

Figure 19B:
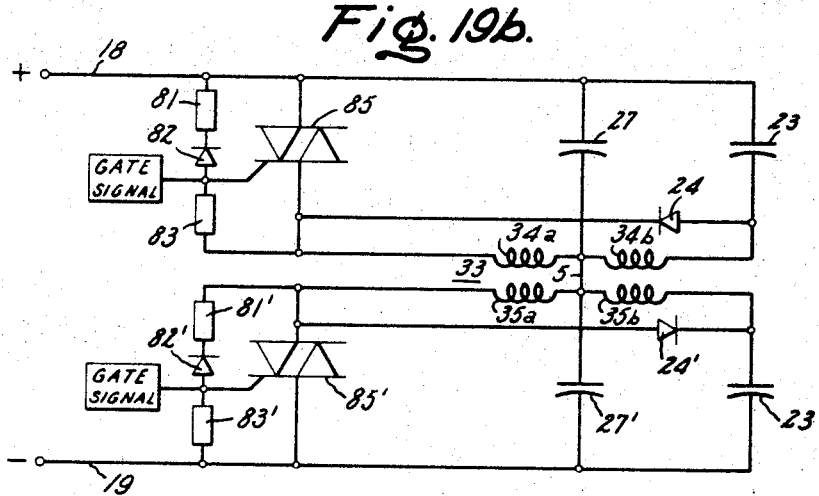

FIGURE 19b of the drawings illustrates a modification of the circuit arrangement shown in FIGURE 19a wherein a solid-state semi-conductor bilateral triode switch 85 is inserted in place of the reverse-polarity parallel-connected SCR's 15 and 15₂. Similarly, a bilateral triode switch 85' is inserted in place of the reverse-polarity-parallel-connected SCR's 15' and 15₂'. The bilateral triode switch (also referred to as a triac) has been described in detail in the above referenced textbook by Gentry, Gutzwiler, Holonyak and Von Zastro, and reference is made to that text for a further detailed description of their manner of operation. Briefly stated, however, the triode switches 85 and 85' are capable of conducting electric current therethrough in either direction depending upon the polarity of the potential applied across their load terminals. From this description of the characteristics of the bilateral triode switches 85 and 85', it can be appreciated that the circuit of FIGURE 19b therefore can be operated in two modes similar to that of FIGURE 19a. Otherwise, the circuit functions in a similar fashion to the circuit arrangement of FIGURE 4 to accomplish commutation off of the bilateral triode switches 85 and 85', and hence will not be described further in detail.

Figure 19C:
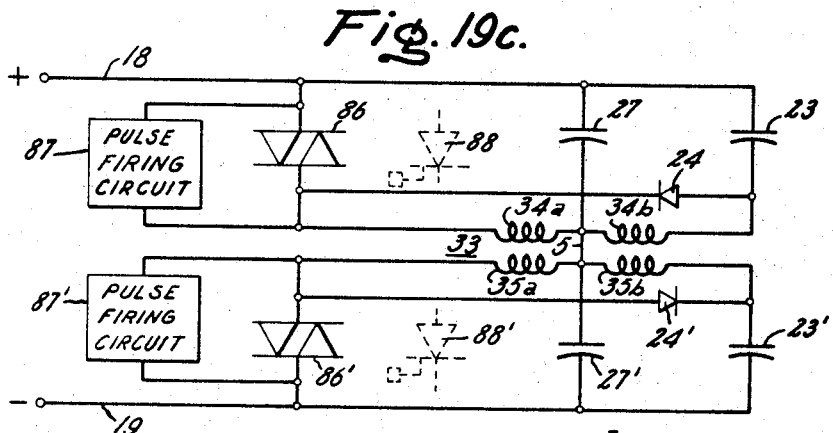

The circuit configuration shown in FIGURE 19c of the drawings is the same as that shown in FIGURE 19b, with the exception that bilateral diode switches (diacs) 86 and 86' are substituted for the bilateral triode switches 85 and 85'. In the case of the bilateral diode switches 86 and 86', they will require special types of pulse-firing circuits 87 and 87', respectively, in order to be gated-on. These pulse-firing circuits are well known in the art and are of the type which provide a sharp rising (high $dv/dt$) gating-on pulse across the load terminals of the bilateral diode switch to cause it to be rendered conductive across its entire cross section. The nature of the bilateral diode switches 86 and 86' and their associated pulse firing circuits 87 and 87' have been described in detail in the above referenced Gentry et al. text, and hence will not be described further. It should be noted, however, that these devices require commutation off in a manner similar to SCR's, triacs, and the remaining thyristors so that they will function in the circuit of 19c in a manner similar to the circuits of 19a and 19b. It might also be noted that in the event that the bilateral characteristic of the diode switches 86 and 86' is not required, it would be possible to substitute therefore conventional SCR's 88 and 88' whose gate circuits are open-circuited and which are rendered conductive by a technique known as $dv/dt$ firing. $Dv/dt$ firing of SCR's 88 and 88' can be accomplished at a faster rate normally than straight gate firing since the device is rendered conductive across its entire cross section almost simultaneously with the application of the $dv/dt$ firing pulse. In the case of $dv/dt$ fired SCR's 88 and 88', there is only a single mode of operation available; namely that of supplying load current to the load. Hence, it will be seen that if the $dv/dt$ fired SCR's 88 and 88' are used, the circuit arrangement of FIGURE 19c will operate more nearly like that shown in FIGURE 4 than those described above with relation to FIGURES 19a and 19b.

From the foregoing description, it can be appreciated that the present invention provides new and improved thyristor power converter circuits which employ unitary, multi-function inductive devices having predesigned leakage inductive reactance that provides for integration of the magnetic functions required by the converter circuits such as output transformation, cushioning, resonating, filtering, insulation from the output, etc. Further, in addition to the above characteristics, the new and improved thyristor power converter circuits employ soft commutation principles in their mode of operation so as to protect the thyristors employed therein against damage. Further, in certain embodiments of the invention herein disclosed, the circuits are self-protecting against open circuits and short circuits, as well as failure to commutate properly. As a result of the above characteristics, power converter circuits constructed in accordance with the invention are much smaller, lighter, and simpler to construct than similar power converter circuits having equivalent power ratings previously available.

Having described several embodiments of new and improved power converter circuits employing integrated magnetics and soft commutation in accordance with the principles of the present invention, it is believed obvious that other modifications and variations of this invention are possible in the light of the above teachings. It is therefore to be understood that changes may be made in the particular embodiments of the invention described herein which are within the full intended scope of the invention as defined by the appended claims.

What I claim as new and desire to secure by Letters Patent of the United States is:

1. A power converter circuit including in combination at least one semiconductor controlled conductivity conducting device, a unitary multi-function inductive device having a plurality of elemental inductive portions possessing predesigned leakage inductive reactance, and means for connecting said unitary multi-function inductive device in electric circuit relationship with said semiconductor controlled conducting device and a source of electric energy in a manner such that the predesigned leakage inductive reactance interacts with the actual inductive reactance of the elemental inductive portions of said device to cause selected ones of the elemental inductive portions to perform multiple different functions during operation of the power circuit.

2. The circuit combination set forth in claim 1, wherein the semiconductor controlled conductivity conducting device comprises a thyristor.

3. The circuit combination set forth in claim 1, wherein said unitary multi-function inductive device has a single magnetically permeable core and a multiplicity of windings and the interaction of the predesigned leakage reactance causes selected ones of the windings to perform multiple different functions.

4. The circuit combination set forth in claim 1, wherein the semiconductor controlled conductivity conducting device comprises a thyristor and the unitary multi-function inductive device comprises an output transformer for the power converter circuit with the predesigned leakage inductive reactance providing the inductive reactance required for commutation of the thyristor.

5. A power converter circuit including in combination, at least one solid-state semiconductor thyristor, means for gating-on the thyristor to cause it to conduct, commutating means operatively coupled to the thyristor for commutating it off, unitary multi-function inductive means having a plurality of elemental inductive portions possessing predesigned inductive leakage reactance, and means for operatively coupling said unitary multi-function inductive means in circuit relationship with said thyristor, said commutating means and a source of electric potential in a manner such that the predesigned leakage inductive reactance interacts with the actual inductive reactance of the elemental inductive portions of the multi-function inductive means to cause selected ones of the elemental inductive portions to perform multiple different functions during operation of the power circuit whereby said unitary multi-function inductive means serves as an output transformer for the power converter and the predetermined inductive leakage reactance in conjunction with selected ones of the inductive elemental portions provide the inductive reactance required by the commutating means.

6. The circuit combination set forth in claim 5, wherein said unitary multi-function inductive means comprises an output transformer and wherein the predesigned leakage inductive reactance provides resonating inductive reactance, cushioning inductive reactance and filter inductive reactance for the power converter circuit.

7. The circuit combination set forth in claim 5, wherein the unitary multi-function inductive means has a single magnetically permeable core and a multiplicity of windings and the interaction of the predesigned leakage reactance causes selected ones of the windings to perform multiple different functions.

8. A power converter circuit including in combination, first semiconductor power thyristor means, unitary multi-function inductive means having a plurality of elemental inductive portions possessing predesigned leakage inductive reactance, and second semiconductor power thyristor means connected in series-circuit relationship in the order named across a pair of power supply terminals, commutating means for each of said first and second thyristor means connected in circuit relationship with each of said thyristor means and with said unitary multi-function inductive means, said unitary multi-function inductive means comprising an output transformer for the power converter circuit, and means for operatively coupling said unitary multi-function inductive means to said first and second semiconductor power thyristor means, said commutating means and said power supply terminal in a manner such that the predesigned leakage inductive reactance interacts with the actual inductive reactance of the elemental inductive portions of the unitary multi-function inductive means to cause selected ones of the elemental inductive portions to perform multiple different functions during operation of the power circuit whereby said selected elemental inductive portions in conjunction with the predesigned leakage inductive reactance provides the inductive reactance required by the commutating means.

9. The circuit combination set forth in claim 8, wherein said unitary multi-function inductive device has a single magnetically permeable core and a multiplicity of windings.

10. A power converter circuit including, in combination, first semiconductor power thyristor means, a unitary multi-function output transformer having first and second center-tapped primary windings inductively coupled through a single magnetically permeable core member to a secondary winding, said primary winding being inductively intercoupled through leakage inductive reactance paths and having their center tap points connected together, one-half of the first primary winding being connected through a first thyristor means to one power supply terminal, second semiconductor power thyristor means connected between an opposite polarity power supply terminal and the half of the second primary winding adjacent that half of the first primary winding to which the first thyristor means is connected, a first commutating capacitor connected in series-circuit relationship with the remaining half of the first primary winding, the series circuit thus formed being connected between the center tap point and the first-mentioned power supply terminal, a second commutating capacitor connected between the center tap point and the first-mentioned power supply terminal, a first blocking diode connected between the junction of the first thyristor means and its winding half and the junction of the first commutating capacitor and its winding half, a third commutating capacitor connected in series-circuit relationship with the remaining half of the second primary winding, the series circuit thus formed being connected between the center tap point and the opposite polarity power supply terminal, a fourth commutating capacitor connected between the center tap point and the opposite polarity power supply terminal, and a second blocking diode connected between the junction of the second thyristor means and its winding half and the junction of the third commutating capacitor and its winding half.

11. The power converter circuit set forth in claim 10, further characterized by feedback diode means connected in reverse polarity parallel-circuit relationship with each of said first and second semiconductor power thyristor means.

12. The power converter circuit set forth in claim 10, wherein the first and second semiconductor power thyristor means are comprised by silicon-controlled rectifiers.

13. The power converter circuit set forth in claim 10, wherein the first and second semiconductor power thyristor means are comprised by pairs of silicon-controlled rectifiers connected in reverse polarity back-to-back circuit relationship.

14. The power converter circuit set forth in claim 10, wherein the first and second semiconductor power thyristor means are comprised by power diacs.

15. The power converter circuit set forth in claim 10, wherein the first and second semiconductor power thyristor means are comprised by power triacs.

16. The power converter circuit set forth in claim 10, further characterized by rectifier means connected in circuit relationship with the secondary winding of the output transformer for providing a regulated direct current output potential from the power converter circuit.

17. The power converter circuit set forth in claim 10, further characterized by clamping diode means connected in series-circuit relationship with each of said first and second semiconductor power thyristor means, the series circuits thus comprised being connected across the power supply terminals.

18. The power converter circuit set forth in claim 10, wherein the first power semiconductor thyristor means comprises a plurality of series-connected silicon-controlled rectifiers with each of said silicon-controlled rectifiers having an associated reverse polarity parallel-connected feedback diode and parallel-connected load-sharing resistor.

19. A power converter circuit including, in combination, first semiconductor power thyristor means, a unitary multi-function output transformer having first and second primary winding halves inductively coupled through a single magnetically permeable core member to a secondary winding, the first primary winding half being connected through the first thyristor means to one power supply terminal, second semiconductor power thyristor means connected between an opposite polarity power supply terminal and the remaining primary winding half, first and second commutating capacitors connected in series-circuit relationship with a non-capacitive impedance element across the power supply terminals, first blocking diode means connected between the juncture of the first power thyristor means and its associated winding half and the juncture of the first commutating capacitor and the non-capacitive impedance element, second blocking diode means connected between the juncture of the second power thyristor means and its associated winding half and the juncture of the second commutating capacitor and the non-capacitive impedance element, and third and fourth commutating capacitors connected in series-circuit relationship across the power supply terminals with the juncture of the third and fourth commutating capacitors being connected to the mid-tap point of the primary winding halves.

20. A multi-phase power converter circuit comprised by a pluarity of single-phase power converter circuits as set forth in claim 10, wherein the blocking diode means associated with each of the individual single-phase converter circuits as recited in claim 10 are connected between the commutating capacitors of the next adjacent phase and the semiconductor power thyristor means of the said phase with one of the terminal phases having its blocking diode means connected between a pair of auxiliary commutating capacitors and the semiconductor power thyristor means of said terminal phase, the auxiliary commutating capacitors being connected in series-circuit relationship with a non-capacitive impedance element across the power supply terminals.

21. A three-phase power converted circuit comprising three sets of two power semiconductor devices of the type requiring a reversal in the polarity of the potential across their load terminals to discontinue conduction therethrough, each of said sets of two semiconductor devices being connected in series-circuit relationship with a respective associated output transformer across a pair of power supply terminals with all three series circuits thus formed being connected in parallel-circuit relationship and with the output transformer in each series circuit having a pre-designed leakage reactance that serves to limit the rate of rise of load current through its associated semiconductor device upon the device being turned on, three sets of two series connected commutating capacitors, means operatively coupling an intermediate tap point on the primary winding of each of the output transformers to an intermediate tap point on one of the respective associated sets of commutating capacitors, first and second terminal commutating capacitors connected in series-circuit relationship with a resonating inductor across the pair of power supply terminals, a first pair of blocking diodes intercoupling the first terminal commutating capacitor and one of the power semiconductors in the first set thereof and intercoupling the second terminal commutating capacitor and the remaining power semiconductor in the set, respectively, a second pair of diodes intercoupling one of the power semiconductors in the second set thereof and one of the commutating capacitors in the first set of series connected commutating capacitors, associated with the first set of power semiconductors, and intercoupling the remaining power semiconductor of the second set with the remaining capacitor of the aforesaid first set of commutating capacitors, respectively, and a third pair of diodes intercoupling one of the power semiconductors in the third set thereof and one of the commutating capacitors in the second set of series connected commutating capacitors associated with the second set of power semiconductors, and intercoupling the remaining power semiconductor of the third set with the remaining capacitor of the said second set of series connected commutating capacitors.

22. A semiconductor power converter circuit including, in combination, commutating circuit means operatively coupled across the load terminals of a power semiconductor device of the type requiring a reversal in the polarity of the potential across its load terminals in order to discontinue conduction therethrough, resonating and cushioning inductive reactance means operatively connected in circuit relationship with the power semiconductor for limiting the rate of rise of current therethrough upon the semiconductor device being turned on, feedback means providing a feedback path between said resonating and cushioning inductive reactance means and said commutating circuit means for feeding back the energy of the resonating and cushioning inductive reactance means to the commutating circuit means during commutating intervals to thereby employ the energy of the cushioning inductive reactance means to commutate off the power semiconductor device, said resonating and cushioning inductive means being comprised by the leakage inductive reactance of a unitary multifunction inductive device having predesigned leakage reactance therein.

23. The circuit combination set forth in claim 22, wherein the unitary multi-function inductive device has a single magnetically permeable core and a multiplicity of windings.

24. A soft commutation circuit for a power semiconductor comprising commutating capacitance means and unidirectional conducting means connected in series circuit relationship, the series circuit thus formed being operatively coupled across the load terminals of a power semiconductor device of the type requiring a reversal in the polarity of the potential across its load terminals in order to discontinue conduction therethrough, and with the series circuit being connected in a manner such that the commutating capacitance means is operatively coupled across the power semiconductor device and limits the rate of rise of voltage across the device upon the device reverting to its blocking non-conducting condition, a single resonating and cushioning inductive reactance means operatively connected in circuit relationship with the power semiconductor for limiting the rate of rise of current therethrough upon the semiconductor device being turned on, and for providing all of the inductive reactance required by the commutation circuit for successful commutation off of the power semiconductor device, and means providing a feedback path between said resonating and cushioning inductive reactance means and said commutating capacitance means for feeding back the energy of the resonating and cushioning inductive reactance means to the commutating capacitance means and reversing the polarity of the potential across the commutating capacitance means during commutating intervals to thereby commutate off the power semiconductor device.

25. A soft commutation circuit for a power semiconductor comprising commutating capacitance means and unidirectional conducting means connected in series circuit relationship, the series circuit thus formed being operatively coupled across the load terminals of a power semiconductor device of the type requiring a reversal in the polarity of the potential across its load terminals in order to discontinue conduction therethrough, and with the series circuit being connected in a manner such that the commutating capacitance means is opertaively coupled across the power semiconductor device and limits the rate of rise of voltage across the device upon the device reverting to its blocking non-conducting condition, a single resonating and cushioning output transformer operatively connected in circuit relationship with the power semiconductor, said output transformer having a pre-designed leakage reactance that serves to limit the rate of rise of current therethrough upon the semiconductor device being turned on, and feedback means providing a feedback path between said resonating and cushioning output transformer and said commutating capacitance means for feeding back the energy of the output transformer to the commutating capacitance means and reversing the polarity of the potential across the commutating capacitance means during commutating intervals to thereby commutate off the power semiconductor device.

26. A new and improved power converter circuit employing integrated magnetics and providing soft commutating including, in combination, first and second load current-carrying power semiconductor devices of the type requiring reversal of the polarity of the potential across their load terminals to discontinue conduction therethrough, means for providing a turn-on signal to the power semiconductor devices, a single resonating and cushioning output transformer means having at least two primary winding elements and a single secondary winding operatively coupled to and supplying a load, said transformer means having a pre-designed leakage providing the cushioning and resonating inductance required by the converter circuit, one of the primary winding elements of the output transformer means being connected in series circuit relationship with the power semiconductor device across one of two first commutating capacitors that are operatively coupled across a pair of power supply terminals, the remaining primary winding element being connected in series circuit relationship with the second power semiconductor device across the remaining one of the first commutating capacitors, said primary winding elements serving to limit the rate of rise of load current through the power semiconductor devices upon the devices being turned on, a second commutating capacitor and unidirectional conducting device connected in series circuit relationship across the load terminals of each of the power semiconductor devices in a manner such that the respective associated second commutating capacitors are directly connected across respective ones of the power semiconductor devices and limit the rate of rise of voltage across the devices upon the devices reverting to their blocking non-conducting condition, and feedback means operatively intercoupled between said resonating and cushioning output transformer and said commutating capacitors for feeding back the energy of the resonating and cushioning output transformer leakage reactance and effecting a reversal in polarity of the potential across the commutating capacitors during commutating intervals to thereby commutate off their associated power semiconductor devices.

27. The combination set forth in claim 26, further characterized by clamping diodes operatively coupled in reverse polarity parallel circuit relationship with each of said power semiconductor devices for feeding back energy around the devices and limiting the voltage applied thereacross.

28. A new and improved power converter circuit employing thyristors which is self-protecting against short circuits and open circuits, said power converter circuit having commutation circuit means operatively coupled to the thyristors for commutating off the thyristors during operation of the circuit, the commutation circuit means being designed to have a commutation frequency near that of the operating frequency of the power converter circuit whereby energy trapped in the power converter due to short circuit or open circuit operating conditions being imposed on the power converter, is stored in the commutating circuit means during conducting intervals of the thyristors without damage thereto, the commutation circuit means being comprised by capacitance means and unitary multi-function inductive means having a plurality of elemental inductive portions possessing predesigned leakage inductive reactance connected in circuit relationship with the capacitance means, and means for interconnecting the unitary multi-function inductive means in the power circuit in a manner such that the predesigned leakage inductive reactance interacts with the actual inductive reactance of the elemental inductive portions of of the multi-function inductive means to cause selected ones of the elemental inductive portions to perform multiple different functions during operation of the power circuit.

29. The power converter circuit set forth in claim 28, which is capable of operation over a wide range of frequencies and wherein the commutation circuit means is designed to have a commutation frequency that is near the maximum frequency of operation of the power converter circuit.

References Cited

UNITED STATES PATENTS

| | | | |
|---|---|---|---|
| 3,149,296 | 9/1964 | Cox | 336—229 X |
| 3,299,279 | 1/1967 | Moore et al. | |
| 3,353,032 | 11/1967 | Morgan et al. | 321—43 X |

LEE T. HIX, *Primary Examiner.*

W. H. BEHA, JR., *Assistant Examiner.*